(12) United States Patent
Vink et al.

(10) Patent No.: US 9,323,070 B2
(45) Date of Patent: Apr. 26, 2016

(54) METHOD FOR PRODUCING A DIFFRACTION GRATING

(75) Inventors: Henri Johannes Petrus Vink, Delft (NL); Huibert Visser, Delft (NL); Aaldert Hidde Van Amerongen, Utrecht (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 32 days.

(21) Appl. No.: 14/124,002

(22) PCT Filed: Jun. 7, 2012

(86) PCT No.: PCT/NL2012/050397
§ 371 (c)(1),
(2), (4) Date: Feb. 10, 2014

(87) PCT Pub. No.: WO2012/169889
PCT Pub. Date: Dec. 13, 2012

(65) Prior Publication Data
US 2015/0034591 A1 Feb. 5, 2015

(30) Foreign Application Priority Data

Jun. 8, 2011 (EP) .................................... 11169180

(51) Int. Cl.
*G02B 27/42* (2006.01)
*G02B 5/18* (2006.01)
(Continued)

(52) U.S. Cl.
CPC ............... *G02B 27/4244* (2013.01); *G01J 3/18* (2013.01); *G01J 3/1804* (2013.01); *G01J 3/24* (2013.01); *G02B 5/008* (2013.01); *G02B 5/1828* (2013.01);
(Continued)

(58) Field of Classification Search
None
See application file for complete search history.

(56) References Cited

U.S. PATENT DOCUMENTS 6,449,096 B1 9/2002 Fabiny et al.
6,788,465 B2 9/2004 Kleemann et al.
(Continued)

FOREIGN PATENT DOCUMENTS

CN 101057132 A 10/2007
CN 101165514 A 4/2008
(Continued)

OTHER PUBLICATIONS

Hori Hironobu et al: "Surface profile dependence of the photon coupling efficiency and enhanced fluorescence in the grating-coupled surface plasmon resonance", Journal of applied physics 107, 114702 (2010).

(Continued)

*Primary Examiner* — Allan Olsen
(74) *Attorney, Agent, or Firm* — Banner & Witcoff, Ltd.

(57) ABSTRACT

A manufacturing method for a grating is disclosed for the angular dispersion of light impinging the grating. The grating comprises tapered structures and cavities. A cavity width and/or corrugation amplitude is varied for achieving a desired grating efficiency according to calculation. A method is disclosed for conveniently creating gratings with variable cavity width and/or corrugation amplitude. The method comprises the step of anisotropically etching a groove pattern into a grating master. Optionally a replica is produced that is complementary to the grating master. By variation of an etching resist pattern, the cavity width of the grating may be varied allowing the optimization towards different efficiency goals.

9 Claims, 24 Drawing Sheets

(51) Int. Cl.
| | |
|---|---|
| *H01S 3/08* | (2006.01) |
| *H01S 3/092* | (2006.01) |
| *H01S 3/0933* | (2006.01) |
| *G01J 3/18* | (2006.01) |
| *H01S 3/16* | (2006.01) |
| *G02B 5/00* | (2006.01) |
| *G01J 3/24* | (2006.01) |

(52) U.S. Cl.
CPC ............ *G02B 5/1852* (2013.01); *G02B 5/1857* (2013.01); *G02B 5/1866* (2013.01); *H01S 3/08009* (2013.01); *H01S 3/092* (2013.01); *H01S 3/0933* (2013.01); *H01S 3/1636* (2013.01)

(56) References Cited

U.S. PATENT DOCUMENTS

| | | | | |
|---|---|---|---|---|
| 6,900,139 | B1 * | 5/2005 | Dakshina-Murthy et al. | ............................ 438/725 |
| 7,519,248 | B2 * | 4/2009 | Iazikov | ................ G02B 5/1861 359/1 |
| 8,068,709 | B2 * | 11/2011 | Iazikov | ................ G02B 5/1866 359/566 |
| 8,579,443 | B2 * | 11/2013 | Hudman | .............. G02B 26/085 348/195 |
| 2004/0021946 | A1 | 2/2004 | Hoose et al. | |
| 2004/0156108 | A1 | 8/2004 | Chou et al. | |
| 2004/0198030 | A1 * | 10/2004 | Buehrer et al. | ................ 438/585 |
| 2007/0090089 | A1 * | 4/2007 | Chang et al. | .................... 216/41 |
| 2008/0230947 | A1 | 9/2008 | Chou et al. | |
| 2012/0001834 | A1 * | 1/2012 | Hudman | .............. G02B 26/085 345/13 |
| 2015/0034591 | A1 * | 2/2015 | Vink | ...................... G02B 5/008 216/24 |

FOREIGN PATENT DOCUMENTS

| | | |
|---|---|---|
| CN | 101459316 A | 6/2009 |
| CN | 201697714 U | 1/2011 |
| GB | 2419940 A | 5/2006 |
| JP | 03-238454 | 10/1991 |
| WO | 2006048660 A1 | 5/2006 |
| WO | 2010102643 A1 | 9/2010 |

OTHER PUBLICATIONS

Popov: "Light diffraction by relief gratings: a macroscopic and microscopic view"; E. Wolf, Progress in optics XXXI, 1993 Elsevier science publishers B.V.

Chabum Lee et al: "The optimization of sawtooth gratings using RCWA and its fabrication on a slanted silicon substrate by fast atom beam etching"; Journal of Micromechanics and Microengineering, 18; 2008; 045014.

Daniel T. Jaffe et al: "Micromachined silicon diffraction gratings for infrared spectroscopy", Proc. SPIE 3354, Infrared Astronomical Instrumentation, 201 (Aug. 21, 1998).

Richard Gratings: "Diffraction Grating Handbook—Chapter 5"; retrieved from the internet: http://gratings.newport.com/information/handbook/chapter5.asp on Nov. 21, 2012.

J.P. Marsh et al: "Production and evaluation of silicon immersion gratings for infrared astronomy", Applied Optics; vol. 46, No. 17; Jun. 10, 2007.

International Search Report—PCT/NL2012/050397—mailing date: Aug. 27, 2012.

* cited by examiner

METHOD FOR PRODUCING A DIFFRACTION GRATING

CROSS-REFERENCE TO RELATED APPLICATIONS

This application is a U.S. National Stage application under 35 U.S.C. §371 of International Application PCT/NL2012/050397 (published as WO 2012/169889 A1), filed Jun. 7, 2012, which claims priority to Application EP 11169180.4, filed Jun. 8, 2011. Benefit of the filing date of each of these prior Applications is hereby claimed. Each of these prior applications is hereby incorporated by reference in its entirety.

FIELD AND BACKGROUND OF THE INVENTION

The present invention relates to the field of diffraction optics, in particular to the design, production, and use of high efficiency diffraction gratings.

The term "grating" refers to a periodic or semi-periodic array of lines on a surface. A diffraction grating operates on the principle that phases of light traveling through different light paths, reflected or transmitted by the grating lines, constructively interfere in certain directions while destructively interfering in other directions. The angular directions with constructive interference form the so called diffraction orders and are known to depend on wavelength of the light and pitch of the grating. There is virtually no light in the angular directions between these orders since the contributions interfere here destructively. Such gratings have various uses in the field of optics.

Diffraction gratings are used e.g. in spectrographs to provide angular dispersion of light. An important parameter of a diffraction grating is its efficiency, i.e. the fraction of the incoming light, in a particular wavelength bandwidth, that is diffracted towards a destination angle where e.g. a detector or further light guiding optics are placed. Diffraction gratings generally operate most efficiently with the transverse electric (TE) components of the electromagnetic waves impinging the grating, i.e. light wherein the electric field oscillates along the direction of the grating lines.

Higher efficiency for gratings is traditionally achieved by improving the quality of the grating, i.e. minimize stray light by minimizing roughness of the groove surfaces, optimizing the groove shape (e.g. blaze angle) to maximize the diffracted light in a certain order. For example, holographic methods can be used to produce gratings with a very uniform line density, therefore resulting in efficient diffraction behavior. Typically, the less uniform the line density, the wider the angular spread of the diffraction order and thus the less resolving power of the grating.

Alternatively, ruling methods can be used to produce sawtooth gratings. The line density typically is less uniform for ruled gratings than for holographically produced gratings. Ruled gratings typically suffer from "Rowland ghosts", generated by the presence of several line densities on the same grating. An advantage of ruled gratings is an increased design freedom over sinusoidal gratings. By adjusting the angle of the ruling tip with respect to the sample, a particular blaze angle can be achieved in the sawtooth pattern, which may result in an improved efficiency over holographically produced gratings. Disadvantageously, ruled gratings are limited by the size and shape of the ruling tip and the precision of the ruling instrument. Further information on holographic and ruled gratings can be found e.g. in the "*Diffraction Grating Handbook, sixth Edition*" by Newport.

Fabini et al. (U.S. Pat. No. 6,449,096) disclose efficiency calculation of triangular gratings as a function of polarization, wavelength, blaze angle, grooves/mm, incident angle, triangle groove height, and back angle. Diffraction gratings are manufactured classically with the use of a ruling engine by burnishing grooves with a diamond stylus in a substrate or holographically with the use of interference fringes generated at the intersection of two laser beams or through a combination of photolithographical etching.

Chou et al. (U.S. 2008/0230947) disclose a method wherein a smooth nanoscale surface pattern is produced. This is achieved by providing a mold substrate crystalline material with a nanoscale pattern of etch resistant material and anisotropically etching the masked mold with a wet etchant having an etching rate in the <111> crystal plane slower than the <100> plane. A replica of the mold is produced by providing a work piece with a moldable surface and pressing together the mold and the work piece. In an embodiment line-uniformity is improved by a method wherein mask material is coated by shadow evaporation on both sides of a resist triangle in two consecutive deposition steps. According to Chou, grating efficiency is improved by the smoothness of the grating sidewalls. However, this improvement may be insubstantial on the overall scheme of efficiency improvements, in particular for a grating operation regime of interest as exemplified in the present disclosure.

There is yet a need for an easy to manufacture diffraction grating with controlled efficiency.

SUMMARY OF THE INVENTION

In a first aspect there is provided a method of manufacturing a master grating for diffracting light of a particular wavelength impinging the master grating or a replica grating of the master grating with a particular angle of incidence. The master grating comprises an array of grooves running in parallel along a planar face of the master grating, the grooves distanced by a grating period; the grooves comprising a triangular profile with flat interfaces, wherein one of the interfaces forms a blaze angle with respect to the planar face.

The method comprises providing a wafer comprising a substantially mono-crystalline material, the material having first, second, and third crystal planes, wherein the first and second crystal planes intersect each other at an intersection angle; cutting the wafer along a wafer surface having a cut angle equal to the blaze angle with respect to the first crystal plane; applying an etching resistant material to parts of the wafer surface in a pattern of parallel strips, the centers of the strips distanced by the grating period, wherein exposed parts of the wafer surface are formed between the strips; applying an anisotropic etching process to the wafer surface that etches faster in a direction normal to the third crystal plane than in a direction normal to the first and second crystals planes to form the grooves at the exposed parts wherein the flat interfaces of the grooves are formed along the first and second crystal planes.

The method further comprises calculating a corrugation amplitude of the grooves with respect to the wafer surface as a function of a desired diffraction efficiency of the light for the given grating period and blaze angle; and in the applying of the etching resistant material, controlling a line width of the strips such that the grooves are formed with the flat interfaces extending from exposed edges of neighboring strips into the wafer surface and intersecting each other with the intersection angle at a depth equal to the calculated corrugation amplitude.

The method according to the first aspect combines calculating, for a particular grating structure, a corrugation amplitude in accordance with a desired diffraction efficiency, and manufacturing said particular grating with the desired corrugation amplitude through control of an anisotropic etching process. The corrugation amplitude is controlled via the anisotropic etching process by controlling the line width of strips of etching resistant material. Diffraction efficiency of a grating may be controlled as a function of corrugation amplitude of the grating profile. Accordingly, there is provided an easy to manufacture diffraction grating with controlled efficiency.

The anisotropic etching process influences exposed parts of the wafer, meaning that the anisotropic etching process occurs between exposed edges of neighboring strips of etching resist material. Due to the nature of the anisotropic etching process the flat interfaces of the grooves are formed along crystal planes of the wafer. The position and direction of the groove interfaces may determine a depth of the etched groove, i.e. the corrugation amplitude. Taking into account a direction of the crystal planes, the line width of the strips may thus be controlled such that grooves are automatically formed by the anisotropic etching process having a depth equal to the calculated corrugation amplitude.

Further advantages may reside in providing an easy to manufacture grating with a tunable grating period, blaze angle, groove shape and corrugation amplitude. More in particular, the grating period can be tuned by changing the period of the resist pattern, the blaze angle can be tuned by changing the orientation of the surface with respect to the crystal axes, the groove shape can be tuned by varying the crystalline material and/or its crystal orientation and by adjusting the etching resist line width, and the corrugation amplitude can be tuned by adjusting the etching resist line width as detailed above. By virtue of the manufacturing method, the grating may also have beneficial stray light characteristics.

In a second aspect there is provided a grating that is arranged for diffracting light of a particular wavelength impinging the grating with a particular angle of incidence, the grating comprising an array of grooves or ridges running in parallel along a planar face of the grating, the grooves or ridges distanced by a grating period; the grooves or ridges comprising a triangular profile with flat interfaces, wherein one of the interfaces forms a blaze angle with respect to the planar face. The flat interfaces of the grooves or ridges comprise an apex angle wherein the flat interfaces intersect each other at an angle between 65 and 75 degrees plane angle corresponding to an intersection angle of crystal planes of a substantially mono-crystalline material. The grooves or ridges are separated by flat interfaces running parallel to the planar face. The grooves or ridges have a corrugation amplitude with respect to the planar face in accordance with the desired diffraction efficiency of the light for the given grating period and blaze angle.

Such a grating may be manufactured using the method of the first aspect wherein the diffraction efficiency of the grating may be controlled by controlling the corrugation amplitude e.g. for a given grating period and blaze angle. Further advantages and areas of applicability of the present systems and methods will become apparent from the detailed description provided hereinafter. It should be understood that the detailed description and specific examples, while indicating exemplary embodiments, are intended for purposes of illustration only and are not intended to limit the scope of the invention.

BRIEF DESCRIPTION OF THE DRAWINGS

These and other features, aspects, and advantages of the apparatus, systems and methods of the present invention will become better understood from the following description, appended claims, and accompanying drawing wherein:

DETAILED DESCRIPTION

Figure 1:
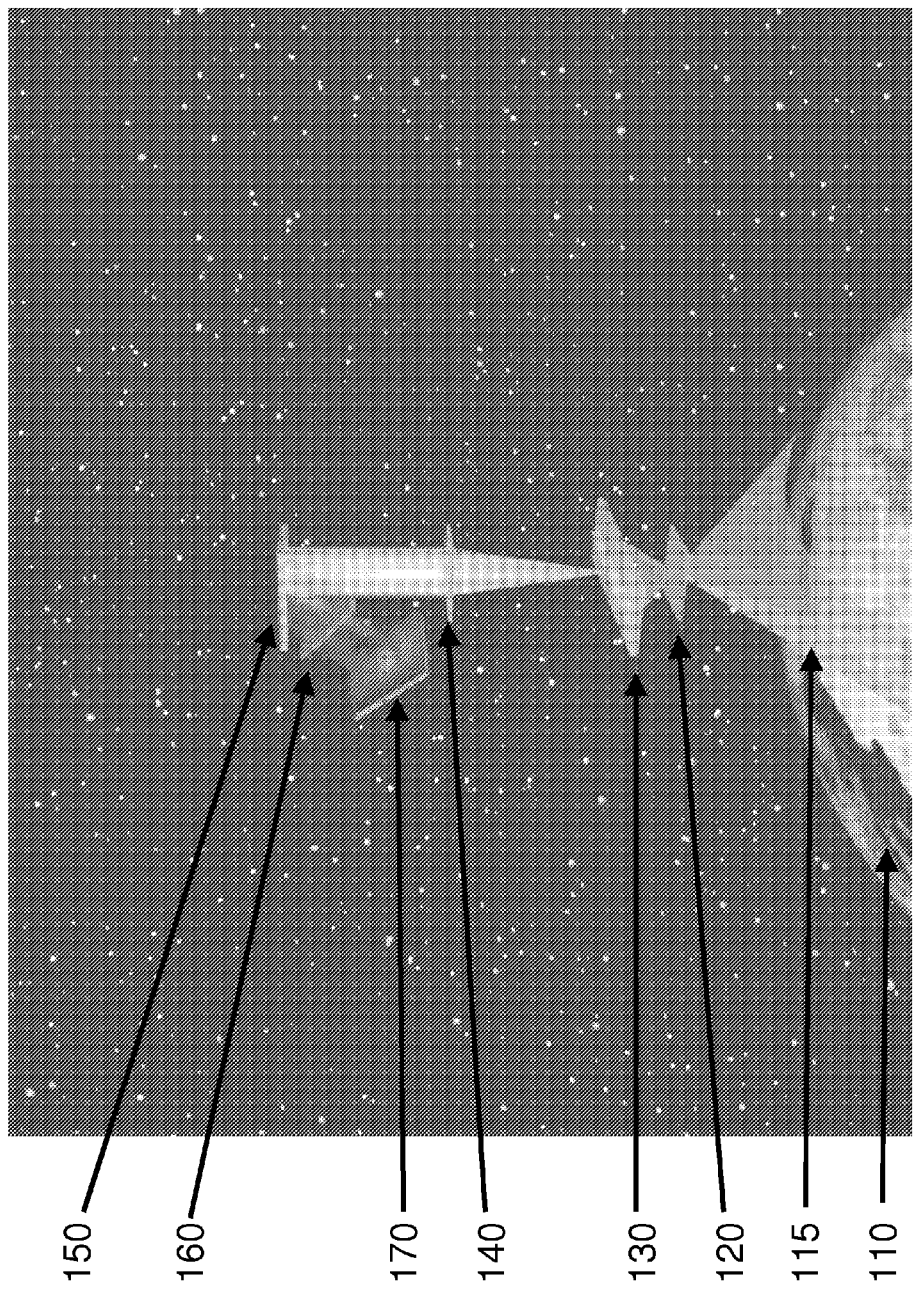
FIG. 1 shows an application for a high efficiency grating in a space based spectrograph.

The following description of certain exemplary embodiments is merely exemplary in nature and is in no way intended to limit the invention, its application, or uses. In the following detailed description of embodiments of the present systems, devices and methods, reference is made to the accompanying drawings which form a part hereof, and in which are shown by way of illustration specific embodiments in which the described devices and methods may be practiced. These embodiments are described in sufficient detail to enable those skilled in the art to practice the presently disclosed systems and methods, and it is to be understood that other embodiments may be utilized and that structural and logical changes may be made without departing from the spirit and scope of the present system. The following detailed description is therefore not to be taken in a limiting sense, and the scope of the present system is defined only by the appended claims. Moreover, for the purpose of clarity, detailed descriptions of well-known devices and methods are omitted so as not to obscure the description of the present system.

This description of the exemplary embodiments is intended to be read in connection with the accompanying drawings, which are to be considered part of the entire written description. In the description, relative terms as well as derivative thereof should be construed to refer to the orientation as then described or as shown in the drawing under discussion. These relative terms are for convenience of description and do not require that the apparatus be constructed or operated in a particular orientation. Terms concerning attachments, coupling and the like refer to a relationship wherein structures are secured or attached to one another either directly or indirectly through intervening structures, as well as both movable or rigid attachments or relationships, unless expressly described otherwise.

FIG. 1 shows an application for a high efficiency and/or low stray light grating in a space based spectrograph. Light in the form of electro magnetic (EM) waves 115, collected from an object, in this case the earth 110 is captured by an incoupling lens 120 and projected on a slit 130. The light entering the slit 130 is captured by a collimator lens 140. The collimator lens 140 projects a collimated beam of light onto a grating 150. The grating 150 angularly disperses the light as a function of a wavelength of the light. The angularly dispersed beams of light are sent under different diffraction angles onto an imaging lens 160. The imaging lens 160 projects an image onto an image plane 170.

The projected image may comprise a wavelength dispersed projection of the slit 130. To capture the image, a detector comprising a sensor may be placed in the imaging plane 170. The sensor may comprise e.g. a photo diode to convert light into an electric signal. The image may be scanned, e.g. by rotating the grating and/or moving the sensor in the imaging plane. The sensor may comprise a single pixel or a plurality of pixels that all detect part of the image. The latter allows for a continuous monitoring of multiple wavelengths.

Figure 2:
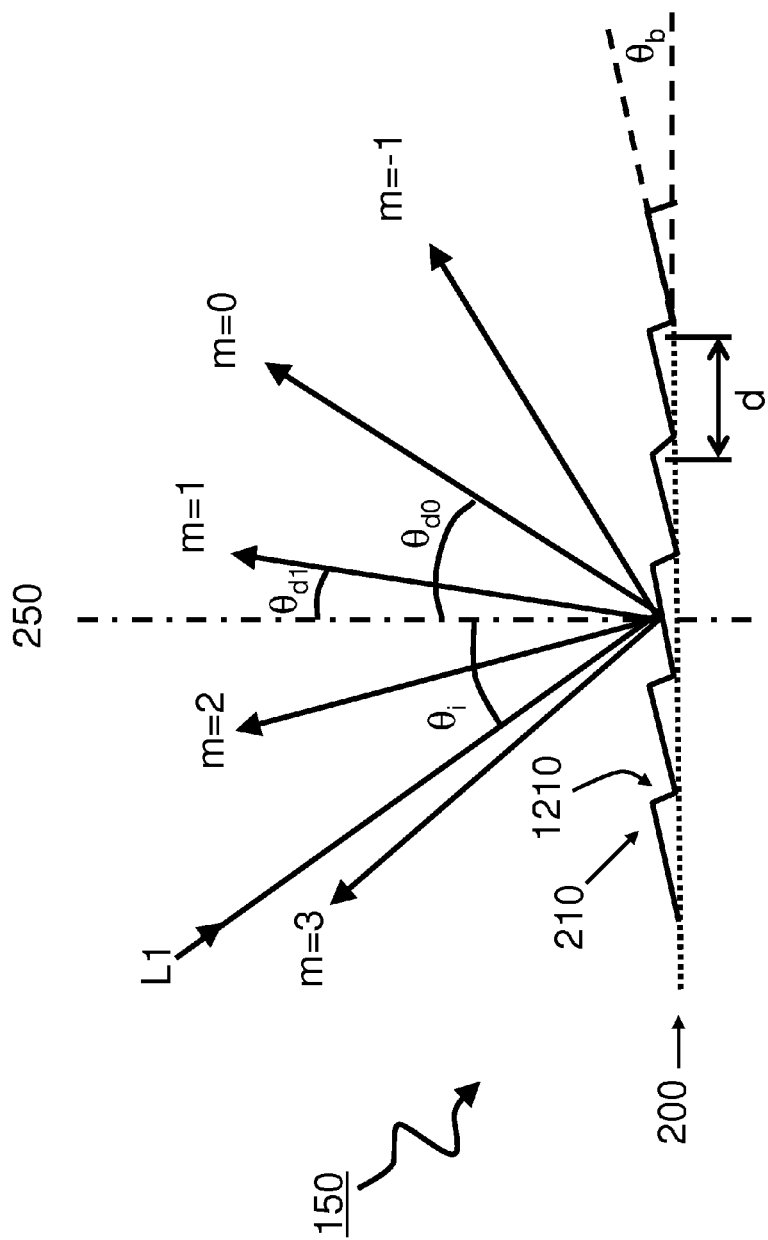
FIG. 2 shows a sawtooth diffraction grating

FIG. 2 shows a side view of a conventional sawtooth diffraction grating. The grating comprises a periodic array of alternating ridges 210 and grooves 1210 running in parallel along a plane 200 of the grating. The grating period d is the distance between the periodic structures. In this case the period d is measured between the tops of the ridges. Alternatively, the grating period d may be defined e.g. as the distance between the centers of the ridges. The ridges 210 form a blaze angle $\theta_b$ with respect to a plane 200 of the grating. Light L1 impinging the grating with an angle of incidence $\theta_i$ is angularly dispersed in a density of lines and wavelength dependent diffraction angle $\theta_d$. The dispersion may take place in different diffraction orders m corresponding to a path length difference equaling m times the wavelength λ of the impinging light. The diffraction angle $\theta_d$ is given e.g. by the grating equation $$d(\sin(\theta_i)+\sin(\theta_{dN}))=m\lambda \quad \text{(E1)}$$

From this equation it may be observed that for non-zero orders m, different wavelengths λ diffract with different angles $\theta_d$. For m=0, this equation leads to $\theta_{d0}=-\theta_i$, i.e. a reflection with respect to a normal 250 of the grating plane 200.

Commercially available gratings are generally arranged and constructed to be used in accordance with a set of use parameters. These parameters may be e.g. advertised with the grating product to be sold such that a potential customer knows if a grating is suitable for their intended use. Alternatively, a customer may order a grating providing the intended use parameters. The use parameters generally comprise the intended wavelength or range of wavelengths λ as well as optionally one or more preferred angles of incidence $\theta_i$ and/or grating period d which may be related according to equation (E1). Additionally, a resulting range of diffraction angles $\theta_d$ may be provided, which may also be calculated using equation (E1), if the period d of the grating is known. Such parameters may thus be regarded as characterizing properties of the grating and may be deduced e.g. from the grating period, blaze angle, and/or the coating material of the grating. E.g. a grating constructed and arranged for a particular central wavelength $\lambda_0$ of light will generally have a reflective coating, e.g. a metal, such that this light is reflected off the coating with a reflectance higher than 50%, preferably higher than 80%, more preferably higher than 90%, most preferably higher than 95%, and ultimately preferably equal to 100%.

Figure 3:
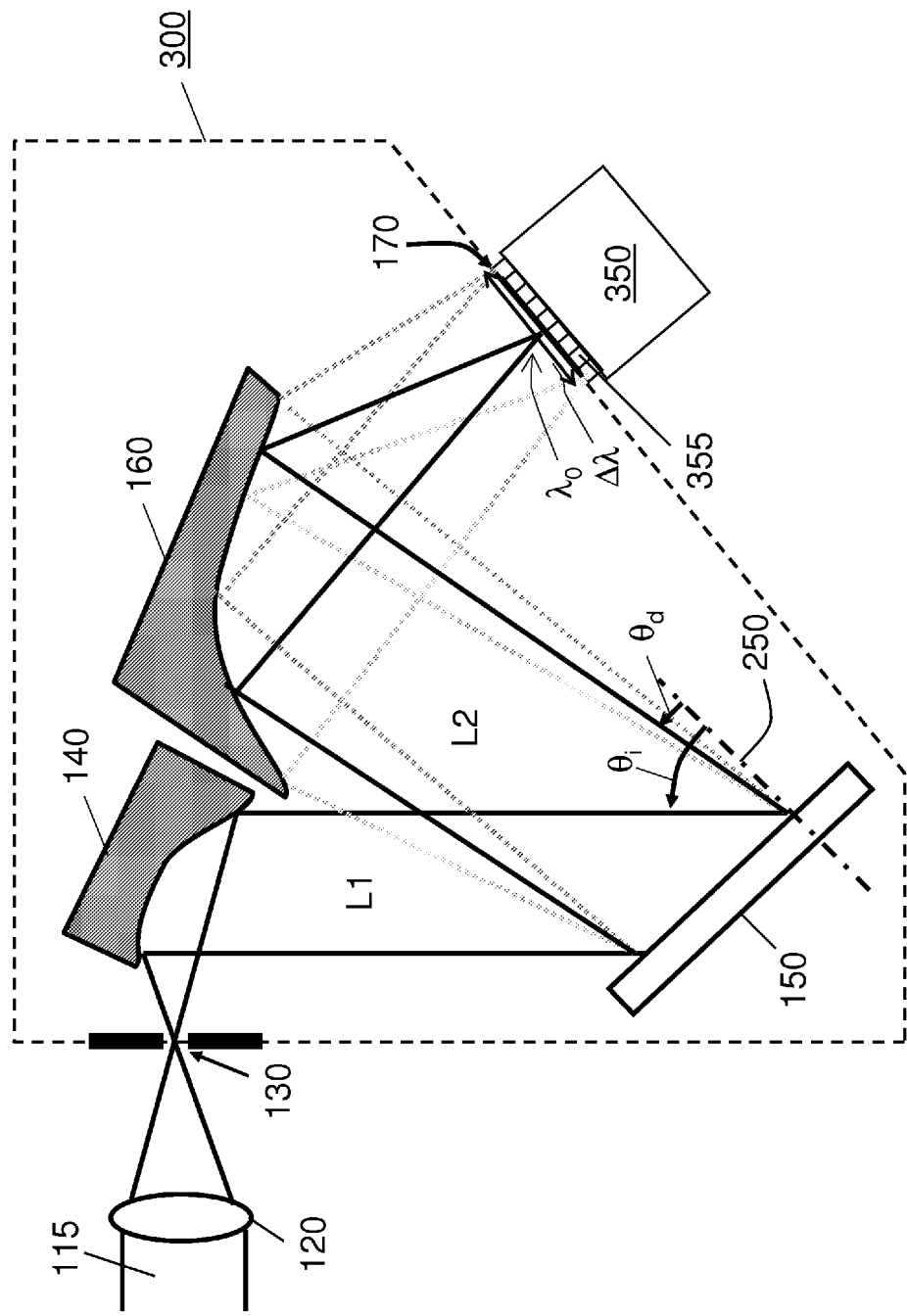
FIG. 3 shows a spectrograph setup including detector.

FIG. 3 shows a spectrograph setup 300. Incoming light 115 is coupled into a light entrance 130, such as a slit or other opening, by an incoupler 120, such as a lens. First light guiding optics 140, in this case a collimating parabolic mirror, are used to collimate the incoming light and direct a collimated beam of light L1 onto grating 150 (to be further disclosed below) under a controlled angle of incidence $\theta_i$ with respect to the grating normal 250. A particular non-zero order of the light is diffracted off the grating in a wavelength and line density dependent diffraction angle $\theta_d$. At least part of this wavelength dispersed light L2 is captured by second light guiding optics 160, in this case another parabolic mirror 160. The second light guiding optics are arranged for guiding light L2 diffracted off the grating in a frequency dependent diffraction angle $\theta_d$ in a non-zero diffraction order, onto an imaging plane 170 of the spectrograph for example such that the central wavelength $\lambda_0$ of a wavelength range λ maps onto a center of the imaging plane 170. A detector 350 with a sensor 355 comprising detection pixels may be placed in the imaging plane 170 to capture a frequency dispersed image.

It is to be understood that for its operation, any number of optical elements may be added or omitted from the spectrograph 300 as long as a beam of light to be analyzed is guided or directed at a controlled angle of incidence onto the grating and light diffracted off the grating in a particular non-zero order is guided and/or projected onto an imaging plane. In particular, it is noted that while in the shown spectrograph a number of optical elements are used to convert the incoming light into a collimated beam, such elements may be omitted in case e.g. the incoming light is already collimated, e.g. a laser beam or light from a distant object such as a star. In that case e.g. the incoupling lens 120, the slit 140, and collimator 140 may be omitted. Also a non-collimated beam of light can be used in a spectrograph. Also the imaging mirror 160 may be omitted, e.g. when the incoming light is a narrow beam such as a narrow laser beam. Whereas in the current figure a spectrograph 300 is shown including a detector 350 in the imaging plane, alternatively subsequent light guiding optics may be used to guide the projected image further on, e.g. using fiber optics, additional mirrors, and/or lenses. Alternative to the shown parabolic mirrors lenses may be used and vice versa. Alternative to parabolic mirrors also other focusing mirrors such as spherical mirror may be employed.

Figure 4:
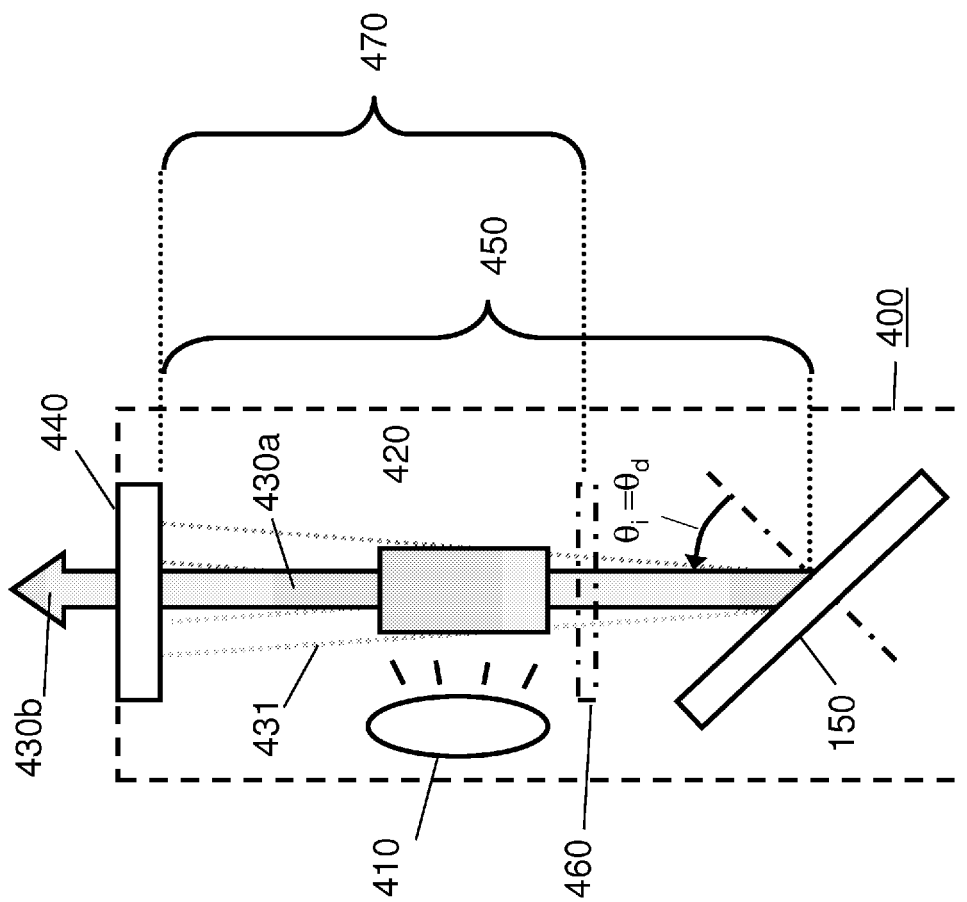
FIG. 4 shows a laser setup comprising a grating.

FIG. 4 shows a laser 400 comprising a gain medium 420, an output coupler 440, and grating 150 to be further disclosed below. The grating 150 and the output coupler 440 form a laser cavity 450 wherein the grating is arranged as a back-reflecting cavity mirror. The output coupler may be a semi-transparent back reflecting mirror (e.g. 95% reflection, 5% transmission). The gain medium 420, e.g. a laser rod of a material such as Titanium sapphire or other crystal, is pumped by lamp 410. The lamp may be e.g. a flash lamp or a diode. It is noted that in the case of a laser or other Littrow configuration, the first light guiding optics that steer the light onto the grating may be the same as the second light guiding optics that catch the light diffracted off the grating in a wavelength dependent diffraction angle in a non-zero order.

The lamp creates a population inversion in the gain medium. A light beam bouncing back and forth in the cavity 450 between the grating 150 and the output coupler 440 picks up additional energy each round trip through the cavity by stimulated emission of radiation in the gain medium. The gain medium generally has a particular optimal gain frequency region where it has optimal performance. This frequency is determined e.g. by an energy difference between different states of excitation in the gain medium. In an advantageous embodiment the grating 150 is arranged such that light 430a of the optimal gain frequency diffracts in an angle $\theta_d = \theta_i$ off the grating, while light 431 of other sub-optimal frequencies is diffracted out of the cavity. In other words the grating is arranged in Littrow configuration for light having the optimal gain frequency. Alternatively, the grating is arranged in Littrow configuration for any other desired laser frequency. Each round trip part of the light 430b is coupled out of the laser cavity through the output coupler 440.

It is noted that it is particularly desirable to have a high efficiency grating in a laser cavity as any losses caused by the grating have to be compensated by gain in the gain medium, for the laser to continue operation. Such losses, e.g. in the form of absorption by the grating, may also cause additional heat problems with possible damage to the grating, in particular for high energy lasers. In particular a Littrow configuration is desirable for a laser cavity because the grating may then act as a cavity end mirror. High efficiency and low stray light will be beneficial to this laser application.

Figure 5:
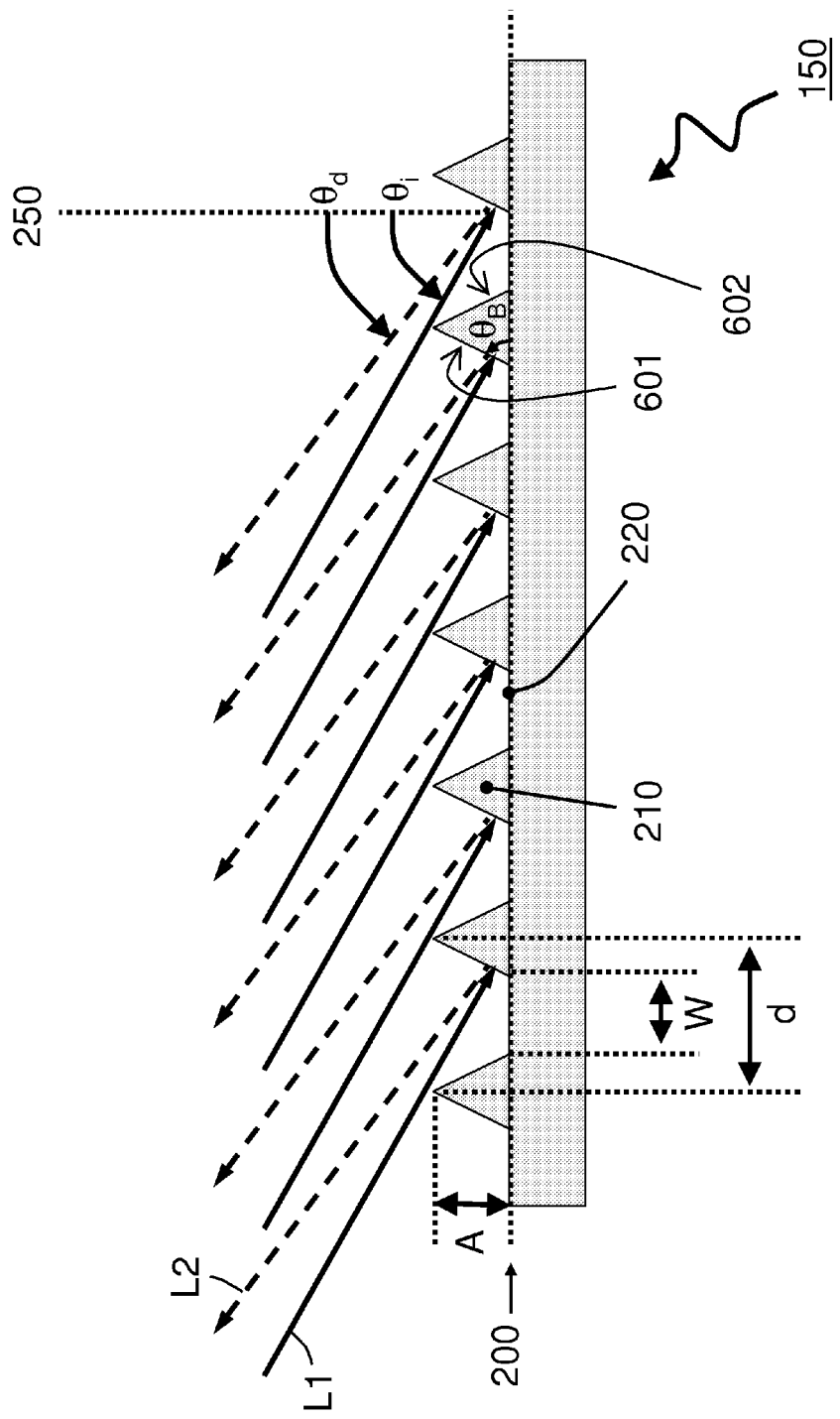
FIG. 5 shows a detailed side view of grating with impinging light.

In a further advantageous embodiment of a diode laser, the grating may be used as part of an external cavity 450 and placed behind an optional internal cavity mirror 460, thus providing a seed wavelength for the main cavity 470. E.g. light bleeding through the cavity back-reflecting mirror 460 may be reflected off a Littrow grating 150 and the wavelength selected by the grating is sent back into the main cavity 470 to seed the lasing process with the selected wavelength, thus stabilizing this wavelength. An advantage of such a setup is that the energy intensity experienced by the grating can be lowered and/or losses can be further minimized FIG. 5 shows a schematic side view in more detail of a grating 150. The grating 150 comprises a periodic array of alternating tapered structures 210 and bottom faces 220 running parallel in a plane of the grating. The tapered structures form elongated lines protruding from a plane 200 of the grating. The tapered structures comprise flat interfaces 601 facing a direction of the impinging light L1 and counterflanks 602. It is noted that, for the effect of the optimized grating structure as further described hereinbelow, the impinging light is not necessarily normal to the interfaces 601. The flat interfaces 601 form a blaze angle $\theta_b$ with respect to the planar face 200. The bottom faces 220 are running parallel to the plane 200 of the grating.

The inventors have surprisingly discovered that particular bottom widths W may lead to an increased efficiency of the grating, e.g. for bottom widths between 10 and 90 percent of the grating period d, i.e. W/d>0.10 and W/d<0.9, advantageous cavity shapes may be formed by the grating structure. An explanation for the efficiency enhancement may be that certain parts of the impinging light may penetrate into the cavities and experience a beneficial interference effect thereof.

E.g. using a computer software program such as PCGrate®, a grating structure such as shown in FIG. 5 may be input and a diffraction efficiency for designated polarization states (e.g. TE, TM) of the incoming light may be calculated as a function of the corrugation amplitude "A" of the grating structure. A particular corrugation amplitude "A" corresponding to a desired diffraction efficiency may be selected and the grating subsequently manufactured according to the method of the first aspect as illustrated e.g. in FIG. 12. Alternative to using a computer software program, the calculation of the grating efficiency as a function of corrugation amplitude may also be performed using other methods, e.g. analytically, numerically, or a combination thereof.

Without being bound by theory, it is currently found that the bottom faces 220 form cavity bottoms and the impinging light results in an electromagnetic field configuration in cavities bounded by these cavity bottoms 220. As will be further detailed below, the electromagnetic field configuration can be calculated as a function of the cavity width W and/or the corrugation amplitude A. The diffraction efficiency can be preset in accordance with a calculated electromagnetic field configuration. In one embodiment, advantageous diffraction efficiencies are obtained when the electromagnetic field amplitudes are extremal for designated polarization states of the impinging light in a region directly adjacent the cavity bottom faces 220.

Advantageously, according to the embodiment of FIG. 5, the tapered structures 210 may be formed by ridges. The term "tapered" refers to the fact that the flanks of the ridges come together at the top to form an apex angle, typically between 10 and 90 degrees. For smaller apex angles the grating may attain a higher line density (when shining from a larger angle of incidence). For too small angles however the corrugation amplitude may become too high. In an advantageous embodiment the apex angles are approximately between 60 and 80 degrees, preferably between 65 and 75 degrees. The tops of the tapered structures preferably form a sharp edge for maximizing grating efficiency, although some flattening on the top may be tolerable. In particular it is desirable that the surfaces of the ridges on which the impinging light falls form as much as possible a flat and smooth interface for minimizing stray light and/or scattering effects.

Certain embodiments similar to the embodiment of FIG. 5 may take further advantage from a special condition known as a Littrow condition wherein $\theta_i \approx \theta_d$, wherein light impinging the grating is diffracted back substantially at the same angle as the angle of incidence. This Littrow condition is substantially fulfilled for $2d \sin(\theta_i) m \approx \lambda$, where m is the diffraction order and λ is the wavelength. In this text we will speak of a Littrow condition or near-Littrow condition if the angle of incidence $\theta_i$ coincides with the angle of diffraction $\theta_d$ within 10 degrees plane angle. In a practical configuration of a spectrograph such as was shown in FIG. 3 it may be necessary to diffract a beam at a slightly different angle, say 10 degrees, in order to spatially separate the incoming and outgoing beams, while still benefitting from a possibly higher efficiency of a Littrow condition. Therefore, in an advantageous configuration a grating is arranged such that the angle of incidence ($\theta_i$) substantially coincides with the diffraction angle ($\theta_d$) preferably within 10 degrees plane angle, more preferably within 5 degrees plane angle, most preferably within 1 degree plane angle or overlapping exactly (within machine precision).

Figure 6:
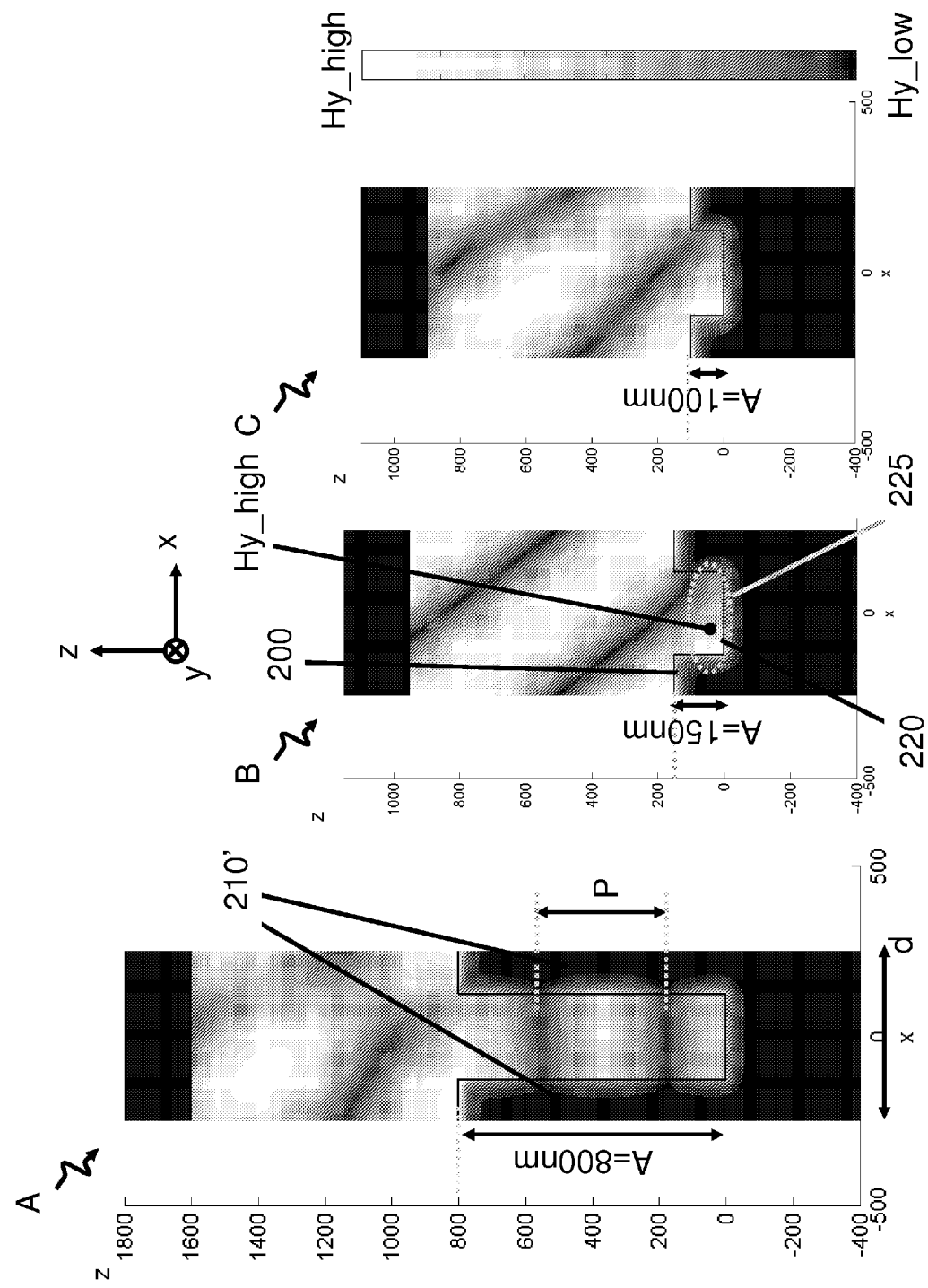
FIG. 6 shows an electromagnetic field distribution above a rectangular grating.

FIG. 6 shows a fraction of an array of alternating elongated grating structures 210' running in parallel along a planar face 200 of the grating according to a grating period d. The structures are arranged in the planar face 200 of the grating and comprise cavity bottom faces 220 with a corrugation depth A.

The impinging light results in an electromagnetic field in resonance cavities 225 bounded by the cavity bottom faces 220 and is calculated as a function of the corrugation depth A.

FIGS. 6A-C show that a diffraction efficiency of the impinging light can be controlled in accordance with a desired diffraction efficiency by varying the corrugation depth A. Advantageously the corrugation depth A is set such that the electromagnetic field amplitude Hy along a direction parallel to the grating structures 210' is extremal for a designated polarization state of the impinging light in a region directly adjacent the cavity bottom 220. For example, the FIG. 6 structures may be manufactured by nanolithography and etch techniques. FIG. 6 shows the magnetic Hy field density distribution above a rectangular grating as a result of TM light impinging the grating and diffracting off the grating structure. The Hy field is the magnetic H field in a "y" direction along a direction parallel to the grating lines, i.e. perpendicular to the given view (cf. the provided xyz axis). Areas of high and low electromagnetic field amplitude have been indicated with light (Hy_high) and dark (Hy_low) colors, respectively.

FIG. 6 A shows the Hy field for an 800 nm deep profile, FIG. 6 B for a 150 nm deep profile, and FIG. 6 C shows the same for a 100 nm deep profile, all with an angle of incidence of 50 degrees plane angle. These graphs illustrate that the Hy field above a grating shows a density fluctuation. From symmetry arguments it may be asserted that this fluctuation has a periodicity along a length of the grating that follows the periodicity of the grating structure itself. In an upward direction however the fluctuation are somewhat more complicated. In the grooves the density fluctuation in FIG. 6 A has a period P that is dependent on the wavelength of the light. This density fluctuation may be described e.g. as a standing wave in the groove. The field fluctuations result from fluctuations in the interference pattern of local electric and magnetic fields that are impinging and refracting of the grating structure.

From FIG. 6 B showing the 150 nm deep grating it may be observed that this grating is close to an optimal efficiency since here, the electromagnetic field amplitude Hy along the y-direction parallel to the grating structure is extremal for impinging TM-polarized light in a region directly adjacent the cavity bottom 220. The 800 nm deep grating of FIG. 6 A is closer to a minimum in efficiency. The optimal corrugation depth can be deduced from these Hy plots. Globally it may be said that the electromagnetic field needs to have an optimal interaction with the side and bottom of the grating, which is the case when the electromagnetic field is high (Hy_high) near the grating surface 220. For the current case the optimal corrugation depth is around 150 nm, as can also be deduced from FIG. 7.

Although in the current graphs a condition for optimal efficiency is illustrated using the magnetic Hy field, other illustrations are possible. In particular, for TE polarized light, a high efficiency is achieved when an electric field amplitude Ey in a "y" direction along a length of the elongated tapered structures (i.e. along the lines of the grating) is maximal near the cavity bottoms as a function of the corrugation amplitudes and/or other geometrical variations of the grating structure such as in the cavity width.

In particular for impinging light with a transverse magnetic (TM) polarization, diffraction efficiency is maximal when a magnetic field component Hy along a direction of the tapered structures is maximal at the cavity bottom as a function of the cavity width. For impinging light with a transverse electric (TE) polarization, diffraction efficiency is maximal when an electric field component Ey along a direction of the tapered structures is maximal at the cavity bottom as a function of the cavity width. Of course it is to be appreciated that also other polarizations of the impinging light may be decomposed into TM and TE components whereby maximal efficiency is reached for combinations of the above criteria.

Figure 7:
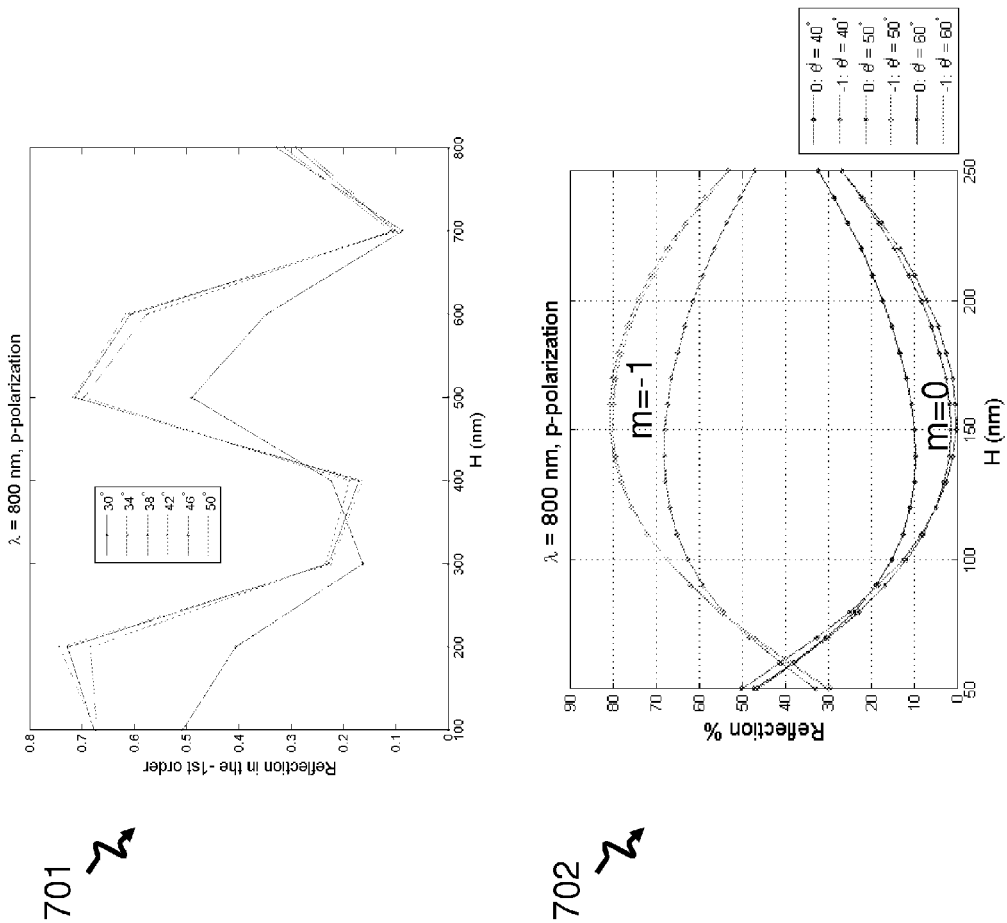
FIG. 7 shows grating efficiency for a rectangular grating as a function of grating corrugation amplitude.

FIG. 7, graph 701 shows the oscillation in efficiency of the −1 order (m=−1) for transverse magnetic impinging light as a function of the corrugation depth of the grating rectangular grating of FIG. 6. Without being bound by theory, a physical explanation for this type of oscillation in terms of field loops is described e.g. by Popov (Prog. Optics, Vol. 31, pp. 141-190, 1993).

In the present case oscillations of the electric and magnetic fields in the cavities of the grating structure may constructively or destructively interfere depending on the depth and/or shape of the cavity. It is currently observed that corrugation depths exist for which the efficiency is very high. For optimum efficiency, electromagnetic field amplitudes should be maximal near the cavity bottoms. There may be multiple optima in the efficiency as a function of the cavity width or corrugation amplitude. In most practical situations wherein the grating has tapered structures, the corrugation will only be deep enough to arrive at the first optimum in the efficiency, i.e. a shallow grating. In graph 702 is shown a close-up of the first maximum for this rectangular grating.

Figure 8:
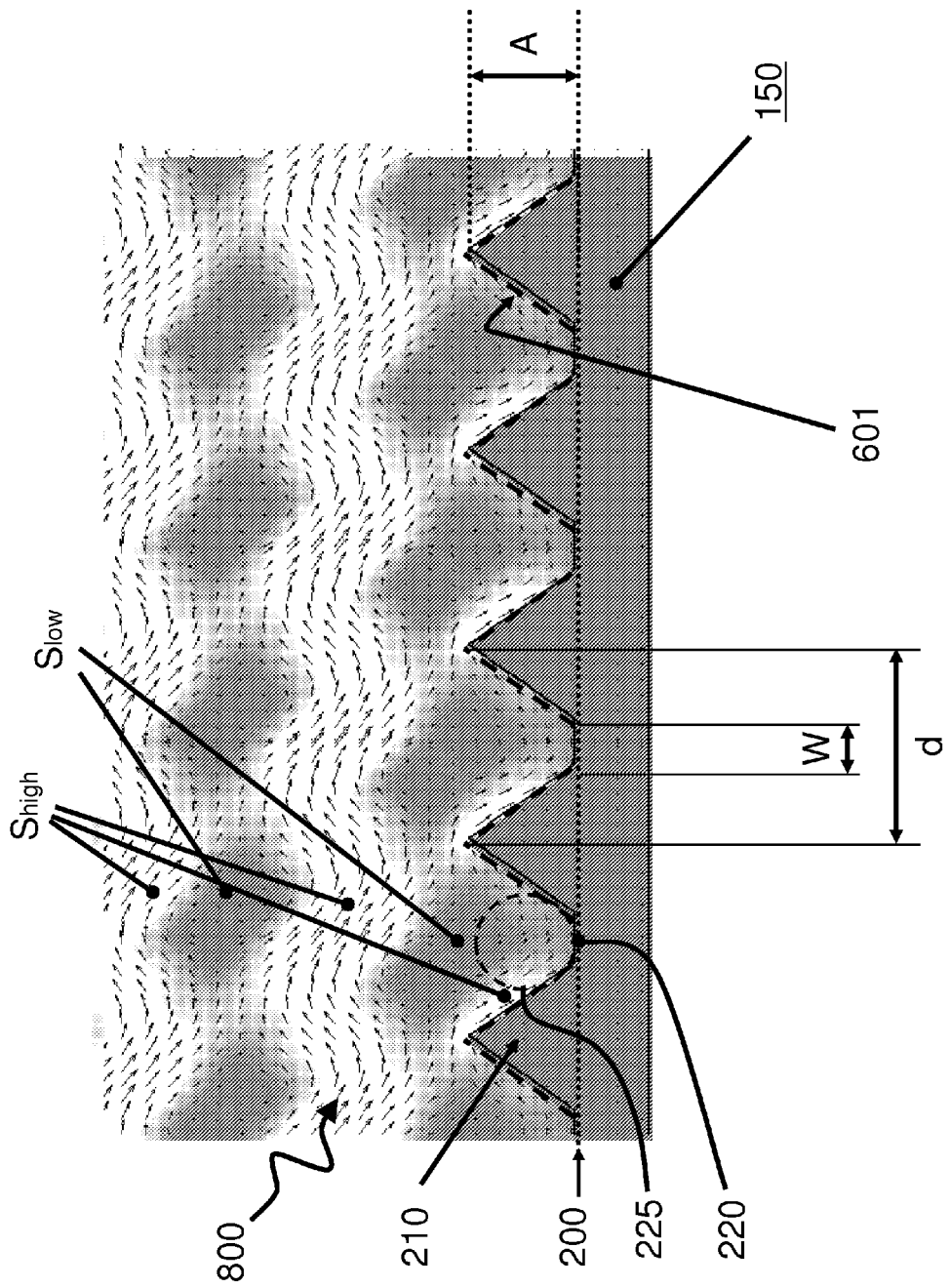
FIG. 8 shows an energy density distribution above a tapered (V-shaped) structure grating.

FIG. 8 shows near field plots of the S field or energy density and direction (Poynting vector field) for an optimal cavity width W and corrugation amplitude A of the tapered structure grating 150. Areas of high and low energy density have been indicated with $S_{high}$ and $S_{low}$, respectively. The wavelength of the impinging light for the calculation is 800 nm and the angle of incidence 42 degrees plane angle. It may be observed in the energy density that the energy is low ($S_{low}$) near the bottom 220 of the (resonance) cavity 225 between the tapered structures 210. The energy density flow field shows a periodicity along the grating that corresponds to the periodicity of the grating itself in accordance with the aforementioned article by Popov "Light diffraction by relief gratings: a macroscopic and microscopic view," Prog. Optics, Vol. 31, pp. 141-190, 1993.

The local energy density and direction may be calculated from the electric and magnetic fields e.g. using the equation:

$$S=Re(E \times H^*); \quad (E2)$$

wherein S is the Poynting vector whose direction and magnitude specify the flow and density of energy, Re( . . . ) is the Real operator for taking the real part of the equation, E is the electric field, and H* is the complex conjugate of the magnetic H-field.

In an advantageous embodiment a grating device is provided with a grating 150 comprising a periodic array of alternating tapered structures 210 and cavity bottom faces 220 running parallel in a plane 200 of the grating according to a grating period d. The tapered structures 210 protrude from or into the planar surface 200 of the grating and comprise flat interfaces 601 facing a direction of the impinging light (L1). The flat interfaces 601 form a blaze angle with respect to the planar surface 200. The resonance cavities 225 comprise flat cavity bottom faces 220. The cavity bottom faces 220 separate the tapered structures by a cavity width W as indicated. The cavity width W is preferably set in a range between 0.1 and 0.9 times the grating period d for controlling a diffraction efficiency of the impinging light in accordance with a desired diffraction efficiency.

As illustrated in FIG. 8, the impinging light results in an energy flow field 800 near the cavity bottom faces 220 that can be calculated as a function of the cavity width W. As is also shown in FIG. 8, the tapered structures 210 may form resonance cavities 225 in between them for the impinging light. The term "resonance cavities" refers to structures that are concave from the point of view of the impinging light, wherein said impinging light may interfere with electromagnetic fields induced from the cavity walls formed by the sides of the tapered structure 210 and cavity bottom formed by the planar face 200. The constructive or destructive interference may result from a combination of the incoming, reflected, and diffracted light as well as any further electromagnetic fields (e.g. surface plasmons) that may radiate from the cavity walls. The inventors have found that in particular the currently proposed grating comprising tapered structures separated by flat cavity bottom faces may provide an advantageous tunable resonance cavity. The idea of a resonance cavity is somewhat analogous to how sound may resonate within an organ pipe at wavelengths that fit in the pipe.

The term "tapered structures 210" may refer to V-shaped grooves into the grating or V-shaped ridges protruding from the grating. In the case of FIG. 8 the tapered structures are protruding ridges.

In another embodiment of an immersion grating (shown e.g. in FIG. 14) the tapered structures may be grooves in the grating and the cavities can be formed inside the grating material. In any case, the tapered structures 210 are to be directed towards the side of the grating 150 where the light impinges. The (resonance) cavities 225 for the impinging light are formed on the direction of the impinging light. When the light comes from free space (front surface grating), as is shown in FIG. 8 cavities may be formed between the ridges. When the light impinges the cavity bottom faces from a direction through the grating material (immersion grating, FIG. 14) the cavities may be formed between the grooves. The grating efficiency can be optimized as a function of the cavity bottom face width between the V-shaped ridges or grooves. The optimization may depend on the use of the grating as a front surface grating or an immersion grating, i.e. the optimal cavity width may be different depending on which side light impinges the grating.

Figure 9:
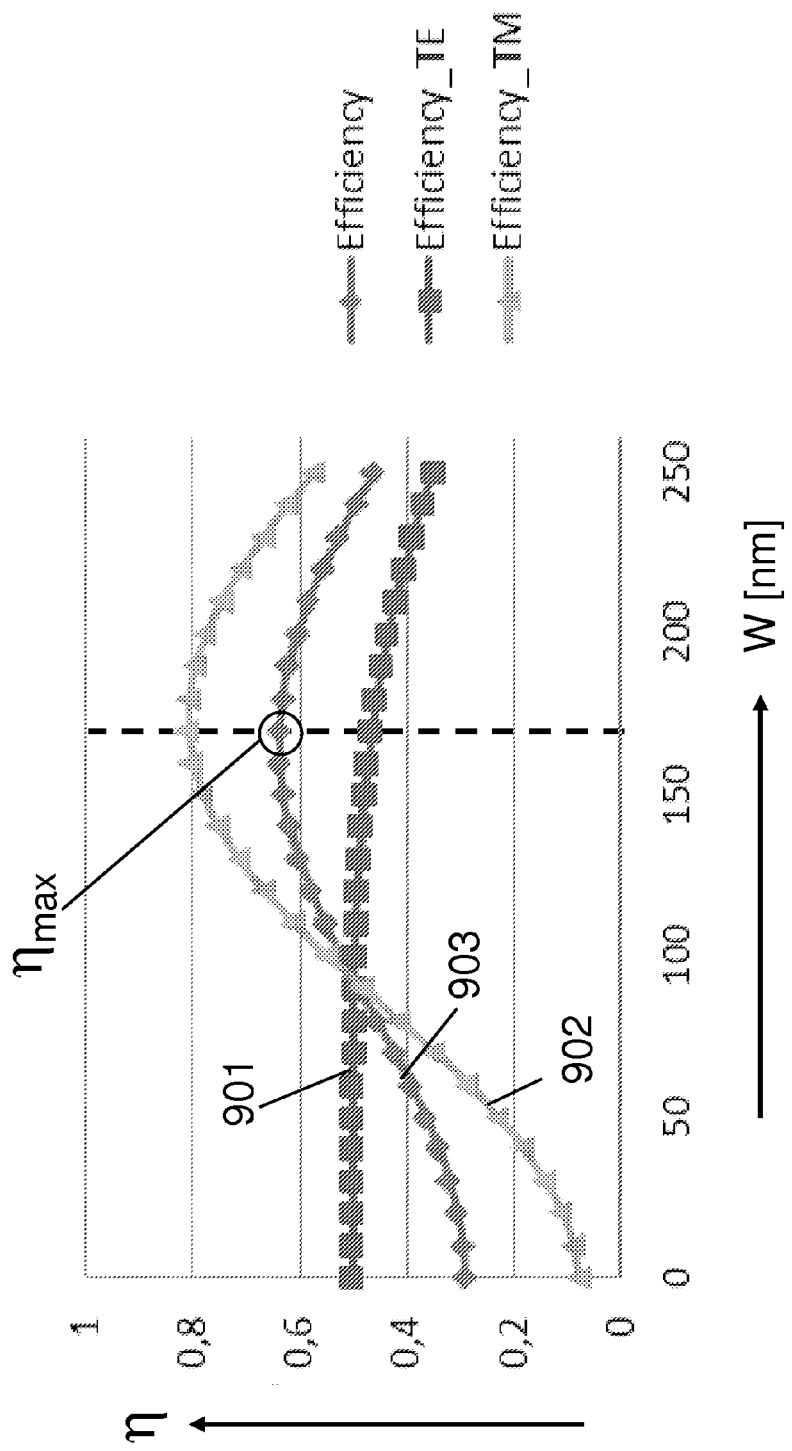
FIG. 9 shows a graph of efficiency as a function of groove bottom (cavity) width.

FIG. 9 shows a graph of grating efficiency as a function of cavity width W. The efficiency may be defined as the fraction of the incoming light, in a particular wavelength bandwidth, that is diffracted towards an imaging plane. In the graph efficiencies 901, 902, 903 are shown for transverse electric (TE), transverse magnetic (TM), and non-polarized light, respectively.

This graph was generated using computer software program PCGrate® with the following parameters: grating period d=500 nm, blaze angle $\theta_b$=54.7 degrees, grating material: resin_1-mkm_Vis-NIR_RG-Newport, grating coating 50 nm Aluminum, angle of incidence $\theta_i$=60 degrees, wavelength of the impinging light 632.8 nm. A scan was done of a trapezoidal landscape, the groove bottom is changed from 0 to 250 nm in 10 nm steps. A penetrating solver algorithm was used with a finite low type of border conductivity. The accuracy optimization had an accelerating convergence, an equal S interval, the number of collocation points was 500, and the maximum number of accountable +/− terms or orders was 250.

It may be observed from this graph that the TE efficiency 901 is less dependent on the cavity width than the TM efficiency. The efficiency of TE light varies between about 50% (h=0.5) for a sawtooth grating (W=0 nm) to about 35% for W=250 nm. Thus the efficiency is lower for higher cavity widths. The efficiency of TM light increases dramatically upon variation of the cavity width from about 7% for a sawtooth grating (W=0 nm) to about 80% for a cavity width of about 170 nm. The overall efficiency is the average of TE and TM light and peaks with a value of about 65% around W=170 nm. The ratio W/d at this width is 170/500=0.34.

Without being bound by theory it is speculated that the efficiency increase for TM light is the result of a better coupling between the impinging light and the cavity modes. Higher cavity widths for a given period d and blaze angle $\theta_B$, correspond to a lower corrugation amplitude A. It is speculated that when the corrugation is varied, the corresponding cavity modes are also varied. This variation of the cavity modes gives rise to an increase in efficiency in the region between 0 and 170 nm. However for a given angle of incidence, any corrugation amplitudes lower than a certain threshold value, may suffer a competing decrease in efficiency. In particular, when the incident light starts impinging not on the protruding ridges but on the flat cavity bottom, a decrease in efficiency may occur. This competing effect of a decrease in efficiency may be observed in this case for cavity widths larger than 170 nm.

It is noted that this effect may particularly influence TM radiation that has an electric field component perpendicular to the lines of the grating and therefore may penetrate deeper into the cavities than the TE radiation which is mostly reflected by the lines of the elongated protruding structures. This polarization dependence effect may be analogous e.g. to a wire grid polarizer that mostly reflects polarizations along a length of the wires while passing polarizations that are perpendicular to the wires.

In a further advantageous embodiment the desired diffraction efficiency is at least 90% of a maximum efficiency that can be achieved by a variation of the cavity width and/or the corrugation amplitude A (e.g. related by equation (E3)). To achieve this, the cavity width W and/or the corrugation amplitude A is set in accordance with a calculation, so as to control the diffraction efficiency to an efficiency of at least 90% of the said maximum achievable diffraction efficiency. E.g. when the maximum diffraction efficiency as a function of the corrugation amplitude is 80% of the absolute maximum diffraction efficiency, the corrugation amplitude A is set in accordance with a calculation, so as to control the diffraction efficiency to an efficiency of at least 72% (=90% of 80%) of the absolute maximum diffraction efficiency.

Alternatively or in addition, preferably, the corrugation amplitude A is set in accordance with a calculation, so as to control the diffraction efficiency to be >90% of an absolute maximum diffraction efficiency.

In an advantageous embodiment of a polarizing grating the desired diffraction efficiency for diffraction of transverse magnetic components of the impinging light is substantially different from an efficiency for diffraction of transverse electric components of the impinging light. Substantially, the difference is at least 90% of a maximum difference that can be achieved by a variation of the cavity width and/or the corrugation amplitude A for obtaining a polarizing grating. To achieve this, the cavity width W and/or the corrugation amplitude A is set in accordance with a calculation, e.g. the cavity width is chosen such that the electromagnetic field amplitude of one of the transverse magnetic or the transverse electric components of the impinging light is minimal as a function of the cavity width. This results in a minimal efficiency for that polarization state.

In another advantageous embodiment of a non-polarizing grating the desired efficiency for diffraction of transverse magnetic components of the impinging light is substantially equal to an efficiency for diffraction of transverse electric components of the impinging light, for obtaining a non-polarizing grating. To achieve this condition, the cavity width (W) and/or the corrugation amplitude A is set in accordance with a calculation, e.g. the cavity width is varied such that the electromagnetic field amplitude at the cavity bottom is balanced for the transverse magnetic (TM) and transverse electric (TE) components of the impinging light. In particular the electromagnetic field amplitudes are balanced such that the TE and TM diffraction efficiencies are substantially equal, e.g. within 10%.

Figure 10:
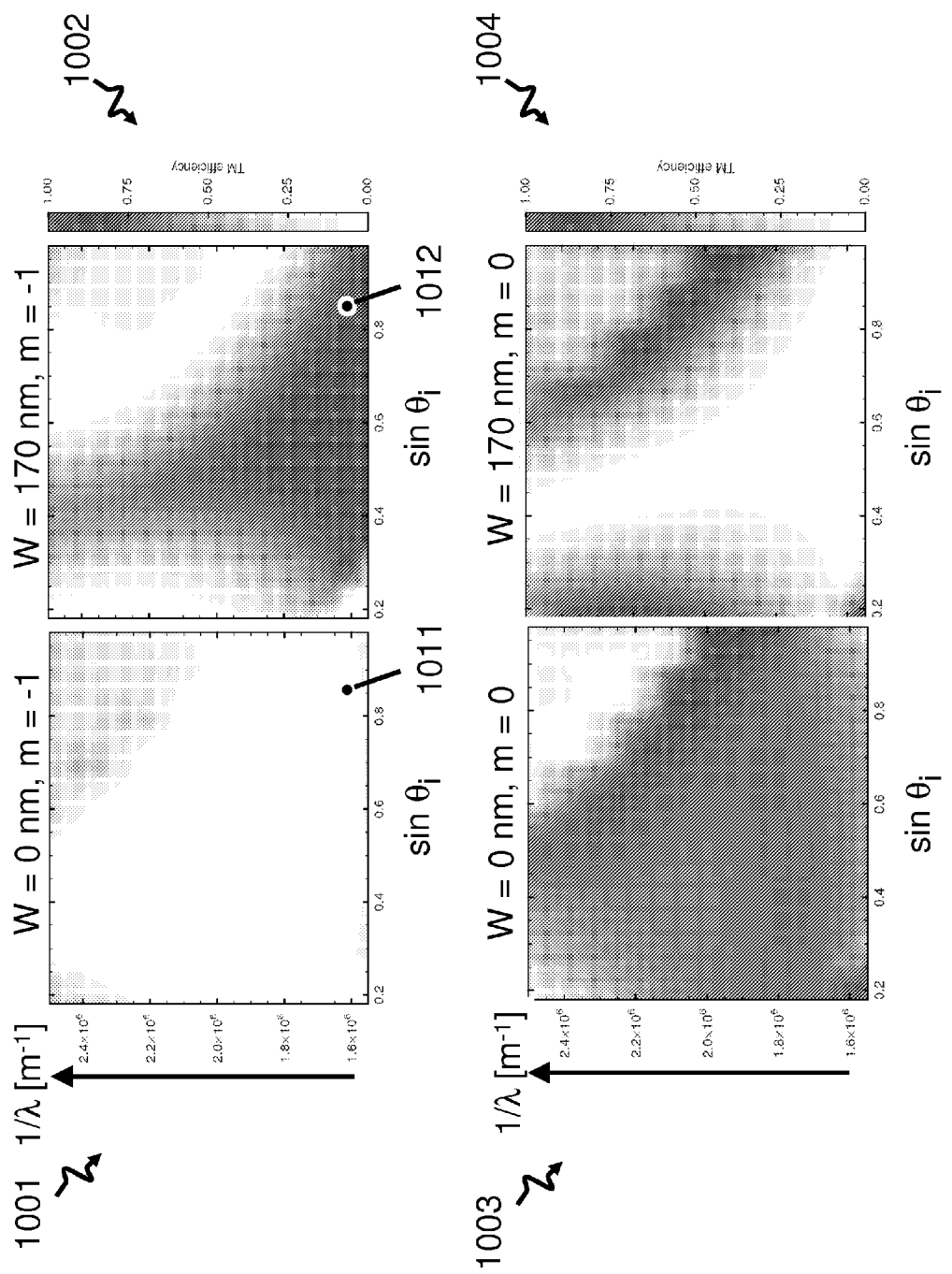
FIG. 10 shows a comparison between a conventional grating and a grating with optimized groove bottom width for non-zero and zero diffraction order zero.

FIG. 10, graphs 1001 and 1002 show a comparison of TM efficiencies between a conventional sawtooth grating (1001) and a grating with optimized groove bottom width for a non-zero diffraction order (1002). The efficiency is shown as a function of the inverse wavelength $1/\lambda$ and the sine of the angle of incidence. The cavity width is 0 nm (i.e. sawtooth) for graph 1001 and 170 nm for graph 1002. All other parameters are the same as in FIG. 9. Darker areas of the graphs correspond to higher efficiencies and lighter areas correspond to lower efficiencies. The color scale for both graphs is the same. The indicated points 1011 and 1012 correspond roughly to the angle of incidence and wavelength of FIG. 9.

It is noted that while both graphs show a variation of the efficiency as a function of the wavelength and angle of incidence, the TM efficiency for the grating with the 170 nm cavity width is superior to the sawtooth grating for most of the parameter space. It is also noted that whereas the sawtooth grating has a few patches of slightly higher efficiency, the 170 nm cavity width grating has a high efficiency over a wide parameter space. For example it may be observed that for particular angles of incidence, $\sin \theta_i$ between about 0.35 and 0.50 ($\theta_i$ between 20 and 30 degrees), the efficiency is higher than about 70% for all wavelengths shown. Such wide wavelength bandwidth efficiency is not present for the sawtooth grating.

Figure 16:
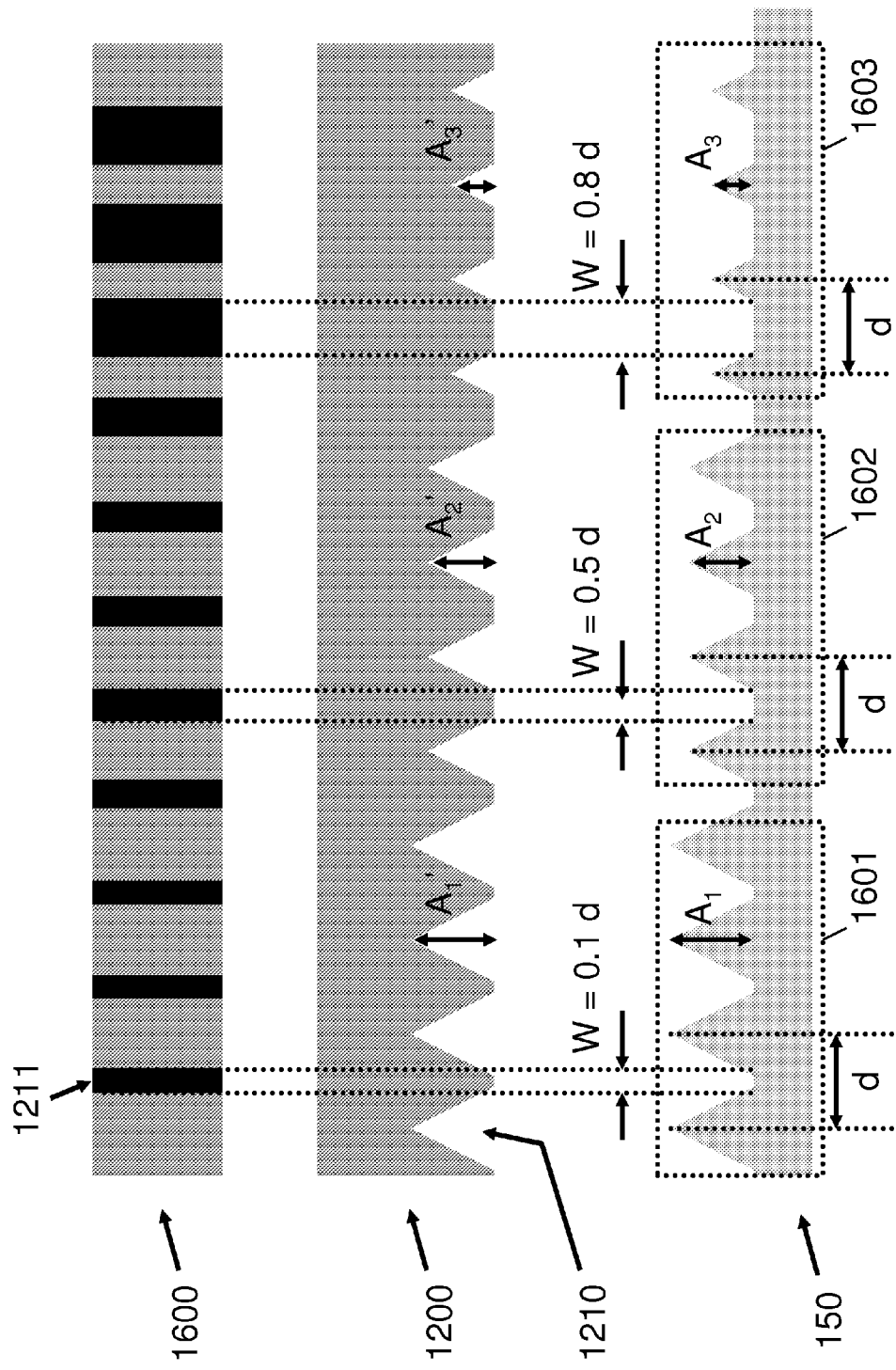
FIG. 16 shows an experimental method for optimizing the grating efficiency as a function of the cavity bottom face width.

FIG. 10, graphs 1003 and 1004 are similar to graphs 1001 and 1002, respectively, but for diffraction order zero (m=0), i.e. a reflection with respect to a normal 250 of the grating plane 200 (see FIG. 2: $\theta_{d0}=\theta_i$). FIG. 10, graph 1003 shows the TM efficiency for a zero order diffraction off a conventional sawtooth grating, i.e. having cavity width W=0 nm. Graph 1004 shows the TM efficiency for a zero order diffraction off a grating with cavity width W=170 nm. When comparing graph 1003 to 1004 it is noted that the sawtooth grating has a higher zero order reflectance (indicated by dark areas) for most of the parameter space. When comparing graphs 1003 and 1004 to graphs 1001 and 1002, respectively, it is noted that these graphs are somewhat complementary. For areas where the non-zero order diffraction is high, the zero order reflectance is low and vice versa. A low or minimal reflectance in zero order is thus shown to be correlated to a high efficiency for non-zero order diffraction. This effect may be advantageously exploited as follows. By measuring e.g. a minimum in the zero order reflectance as a function of cavity width W or any of the other parameters, a corresponding maximum in a non-zero diffraction order may be found. This method may be used e.g. in combination with a grating having a varying cavity width such as shown in FIG. 16. Alternatively, of course also a maximum in a non-zero diffraction order may be measured directly as a function of cavity width.

Figure 11:
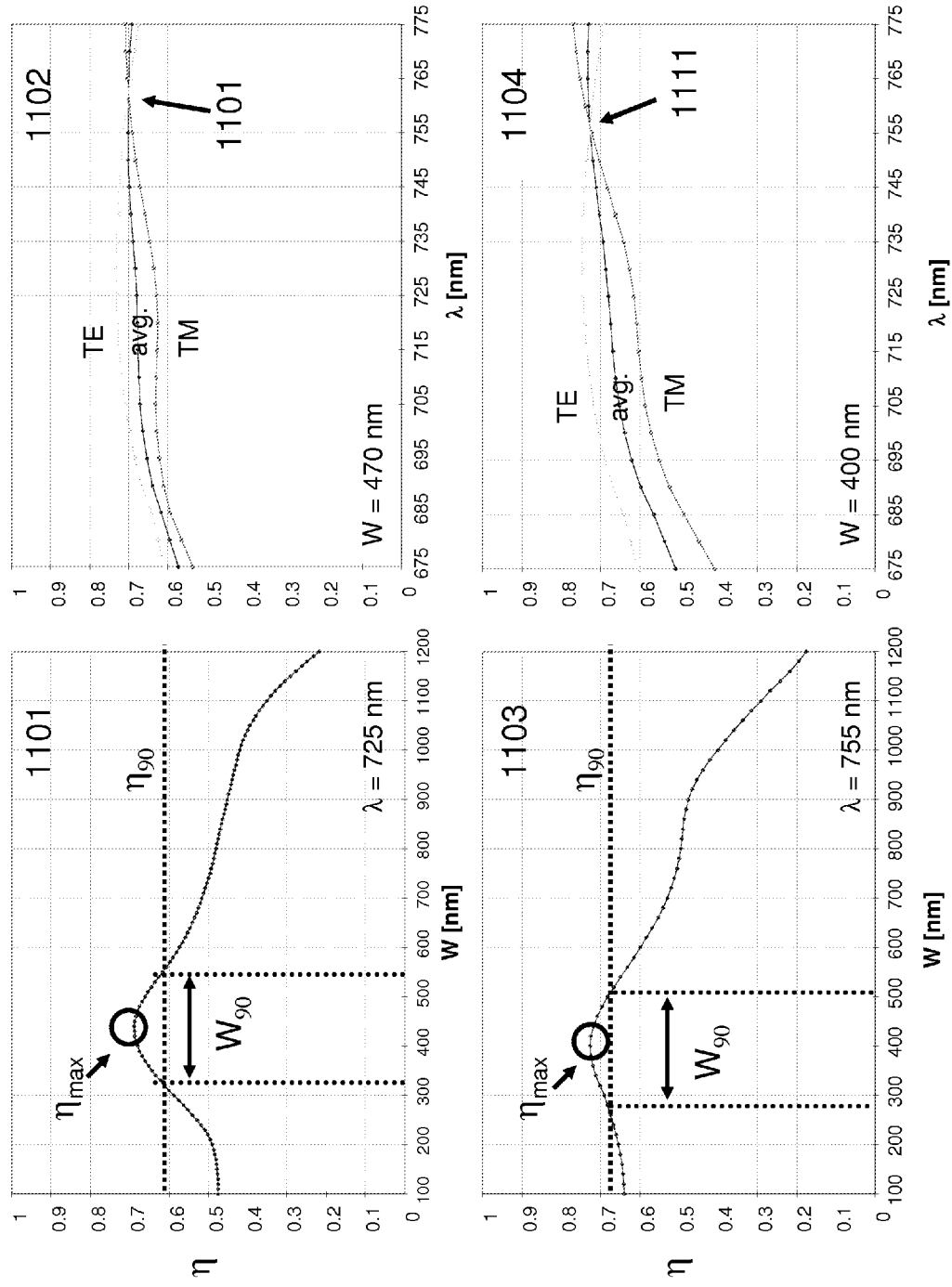
FIG. 11 shows optimization curves for groove bottom width for different wavelengths.

FIG. 11, graphs 1101-1104 show optimization curves for groove bottom width for different wavelengths. All figures are for a blaze angle of 37 degrees.

Graph 1101 shows an efficiency scan of the cavity width W for a wavelength of 725 nm. A maximum efficiency $\eta_{max}=0.68$ is achieved for W=430 nm. A cavity width range $W_{90}=W(\eta > \eta_{90})$ is defined wherein the grating efficiency is within 90% of the maximum efficiency achievable with a variation of the cavity width alone, i.e. for $\eta > 0.9 \eta_{max}$. In particular in this range, the grating has more than 10% better efficiency than a conventional sawtooth grating. Alternatively, an advantageous cavity width range could be defined as those cavity widths wherein more than 50%, preferably 80%, more preferably 90% of the maximum improvement (i.e. the difference between a zero cavity width and the optimum cavity width) in the efficiency of the grating is achieved for TM radiation and/or overall random polarized radiation.

Graphs 1102 shows a scan of the wavelength for the grating of Graph 1101 with a cavity width of 470 nm, i.e. within the 90% optimum cavity width range $W_{90}$. The graph is split into TE efficiency, TM efficiency and average (avg.) efficiency. It may be observed that the efficiency is reasonably uniform for all wavelengths between about 700 and 775 nm. At a particular point 1111, the efficiencies for TE and TM are equal and for this wavelength a non-polarizing grating is obtained, i.e. a grating that does not polarize the impinging light when diffracted. In an advantageous method a non-polarizing grating is obtained by varying the cavity width such that an efficiency for diffraction of TM components of the electromagnetic waves is substantially equal to the transverse electric (TE) components. Alternatively, if a maximally polarizing grating is desired, the cavity width could be varied such that e.g. the TM components are minimal, while the TE components are maximal or vice versa.

Graph 1103 shows a scan of the cavity width W for a wavelength $\lambda=755$ nm (incident light). All other parameters the same as for Graph 1101. It is noted that for this longer wavelength, the maximum efficiency $\eta_{max}$ is higher (about 0.74) than for 725 nm and occurs at a somewhat lower cavity width of about 400 nm. Subsequently, also the range $W_{90}$, wherein an efficiency within 90% of this maximum is achieved, is different than for $\lambda=725$ nm (Graph 1101).

Graph 1104 shows a scan of the wavelength for the maximum efficiency cavity width W=400 nm. Again, the efficiencies for TE, TM, and non-polarized (average) light are shown. It may be observed that although for this cavity width the maximum efficiency is higher, it also varies more as a function of the wavelength than for W=470 nm. Therefore, if a more wavelength independent grating is desired, W=470 may be preferred while if a maximum efficiency is desired W=400 may be preferred.

Figure 12:
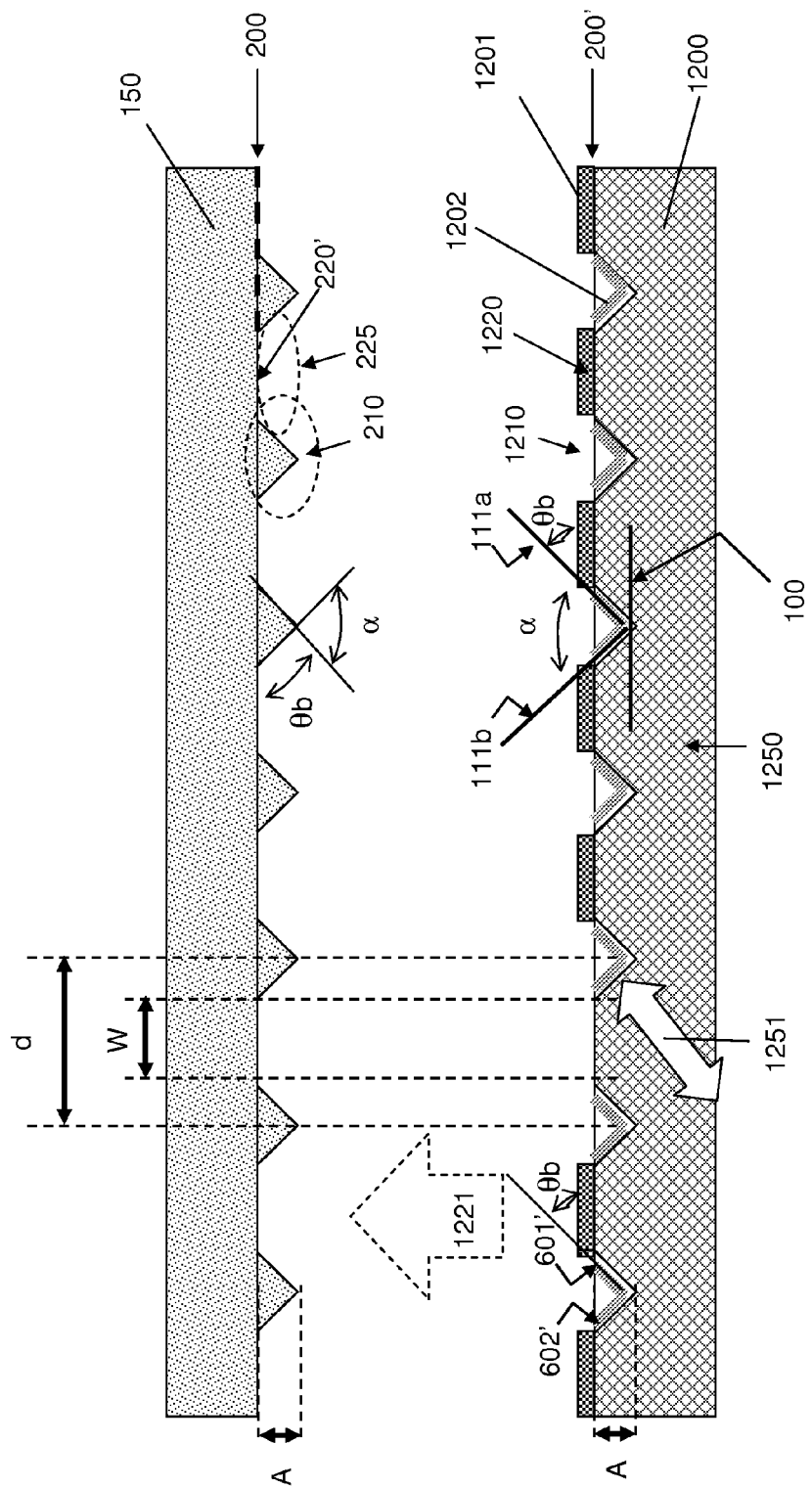
FIG. 12 shows a method for creating a grating with tunable groove bottom width and blaze angle.

FIG. 12 shows a method for creating a replica 150 with tunable groove bottom width and blaze angle. The method comprises the steps of providing a master 1200 comprising a pattern of grooves 1210 and dams 1220 that are complementary to the ridges 210 and valleys 220', respectively, of the replica 150 that is to be created. It is noted that such a master 1200 may also itself be used e.g. as an immersion grating. The grooves 1210 have a groove angle $\alpha'$ that corresponds to the apex angle $\alpha$ of the ridges 210 to be created. The grooves have an inclination angle $\theta_b'$ with respect to a surface 200' of the master 1200 that corresponds to a blaze angle $\theta_b$ of the ridges 210. The groove depth A of the grooves 1210 corresponds to the corrugation amplitude A of the ridges 210. The width W of the dams corresponds of the cavity width W (either of the immersed cavity of the master or the front-surface cavity of the replica).

The dam width W thus defines a cavity width W while the wafer surface 200' forms cavity bottom faces 220' that separate the grooves 1210 by the cavity width W. In an advantageous embodiment the cavity width W is set in accordance with a desired diffraction efficiency, e.g. based on calculations of the energy flow field detailed in FIG. 8, wherein the energy flow field is formed in cavities 225 having the cavity bottom faces 220.

The depth A of the grooves 1210 and a dam width W between the grooves is dependent on a width of the lines of the etching resistant material 1201. The dam width W defines a cavity width W wherein the wafer surface 200' forms cavity bottom faces that separate the grooves 1210 by the cavity width W. As was detailed above in FIG. 8, an energy flow field may be formed in the cavities having the cavity bottom faces. In an advantageous embodiment the cavity width W is set in accordance with a desired diffraction efficiency resulting thereof.

The master grating 1200 comprises an array of grooves 1210 running parallel in a planar face 200' of the master grating 1200. The grooves 1210 are distanced by a grating period d. The grooves 1210 comprise a triangular profile with flat interfaces 601',602'. One of the interfaces 601' forms a blaze angle $\theta_b$ with respect to the planar face 200'.

A method of manufacturing the master grating 1200 comprises providing a wafer 1250 comprising a substantially mono-crystalline material, the material having first and second crystal planes 111a, 111b intersecting each other at an intersection angle α'. The method further comprises cutting the wafer 1250 along a wafer surface 200' having a cut angle equal to the blaze angle $\theta_b$ with respect to the first crystal plane 111a. An etching resistant material 1201 is applied to parts of the wafer surface 200' in a pattern of parallel strips 1211, wherein the centers of the strips 1211 are distanced by the grating period d, and wherein exposed parts of the wafer surface 200' are formed between the strips 1211. An anisotropic etching process 1202 is applied to the wafer surface 200' that etches faster in a direction normal to a third crystal plane 100 than in a direction normal to the first and second crystals planes 111a and 111b to form the grooves 1210 at the exposed parts wherein the flat interfaces of the grooves are formed along the second crystal planes 111.

The method further comprises calculating a corrugation amplitude A of the grooves 1210 with respect to the wafer surface 200' as a function of a desired diffraction efficiency η of the light for the given grating period d and blaze angle θb; and in the applying of the etching resistant material 1201. As shown e.g. in FIG. 12, a line width W of the strips 1211 is controlled such that the grooves 1210 are formed with the flat interfaces 601',602' extending from exposed edges of neighboring strips into the wafer surface 200' and intersecting each other with the intersection angle α' at a depth equal to the desired (calculated) corrugation amplitude A. The same is also demonstrated in FIG. 16, wherein a relation between a width W of the etching resist strips and the corrugation amplitude A is explained.

In a further embodiment, a replica grating 150 may be manufactured. A replica is a copy of the master grating. The method comprises manufacturing a master grating as described above, applying a moldable material to the master grating 1200 to form the replica grating 150, and separating the replica grating 150 from the master grating 1200. The replica grating 150 comprises an array of ridges 210 complementary to the array of grooves 1210 of the master grating 1200. The calculating of the corrugation amplitude A may be performed as a function of the desired diffraction efficiency of the replica grating 150 thus obtained. It is to be appreciated that the replica grating comprises sharp protruding structures with controllable corrugation amplitude not easily obtained through other methods. A further replica of the replica grating 15 may be created to obtain the original profile of the master grating.

Preferably, the mono-crystalline material is silicon. This material may benefit from a wealth of experience for handling and processing. Alternatively also other monocrystalline materials may be used, e.g. having different relative orientations of the crystal planes for obtaining different top and blaze angles.

In an embodiment a reflective layer is applied to the master grating 1200 or replica grating 250. The reflective layer may be e.g. a metal or dielectric layer. Alternatively, the master grating or the moldable material are reflective enough without further added reflective layer for the desired purpose.

In an embodiment, the strips of the etching resistant material 1201 are provided on the wafer using imprint lithography. This technique may provide a desired accuracy and reliability for creating uniformly sized strips of etching resist material.

For example, a technique known as "Substrate Conformal Imprint Lithography" (SCIL), developed by Philips Research, Eindhoven, may be suitable. The Substrate Conformal Imprint Lithography (SCIL) technique combines advantages of a soft composite working stamp for large area patterning with a rigid glass carrier for low pattern deformation and best resolution. SCIL uses a sequential imprinting principle that applies capillary forces instead of backside pressure, which minimizes air inclusions even on large areas, ensuring highest uniformity. The sequential separation of stamp and substrate avoids high forces and allows for a clean and reliable disconnection without damage to the patterned structures. The performance in respect to substrate conformity and pattern fidelity over large areas may make this imprint technology a suitable tool, for applications like LED/VCSEL, optical elements, patterned media or functional materials such as printed electronics or RFIDs.

Alternatively or in addition Nano Imprint Lithography (NIL) may be used for applying the strips of etching resist material. The stamp used in the imprint lithography steps may be manufactured e.g. using holographic techniques for providing a desired coherence between the grating lines over the relatively large grating surface.

As used herein, lattice planes and lattice directions may be described by a mathematical description known as a Miller Index. This allows the specification, investigation, and discussion of specific planes and directions of a crystal. E.g. in the cubic lattice system, the direction <hkl> or (h,k,l) defines a vector direction normal to the surface of a particular plane or facet. Miller indices are referenced to the crystallographic axes of a crystal. They therefore do not have to be oriented at right angles, though they may correspond to the x, y, z, axes in cubic lattice structures. For monoclinic and triclinic crystals, there may be four numbers to every Miller index. Cubic lattices may have only three, however, and an algorithm for determining these Miller indices can be as follows:

(1) Determine the points at which a given crystal plane intersects the three axes, for example at (a,0,0), (0,b,0), (0,0,c). If the plane is parallel an axis, it is said to intersect the axis at infinity.

(2) The Miller index for the face is then specified by (1/a, 1/b, 1/c), where the three numbers are expressed as the smallest integers (common factors are removed). Negative quantities may be e.g. indicated with an overbar.

The first and second crystals planes 111a and 111b may be the structurally similar, e.g. they may both be (mirror-symmetric) <111> crystal planes. An etching rate in a direction normal to the first crystal plane 111a may thus be substantially equal to an etching rate in a direction normal to the second crystal plane 111b. The etching rate in a direction normal to the third crystal plane 100, e.g. a <100> crystal plane, may be much faster than an etching rate in a direction normal to the first and second crystal planes 111a and 111b. The difference in etching rate may result in a preferential etching direction, i.e. anisotropic etching.

In an advantageous method a grating master 1200 may be created as follows. A mono-crystalline silicon wafer 1250 is cut at a particular angle with respect to a crystal orientation 1251. As shown e.g. in FIGS. 12 and 13, the monocrystalline material has first 111a, second 111b, and third 100 crystal planes, wherein the first 111a and second 111b crystal planes intersect each other at an intersection angle α'. The wafer comprising is cut along a wafer surface having a cut angle equal to the blaze angle with respect to a first crystal plane. The cut surface 200' is covered with a layer of Silicium Nitride (SiN) which will act as an etching resist 1201. The SiN layer is covered with a photo-resist (shown e.g. in FIG. 23). A light pattern is projected onto the photo resist, e.g. with known lithographic techniques. The pattern comprises a series of parallel stripes with a center to center distance equal to the grating period d and a stripe width roughly corresponding to the cavity width (or the ridge width, depending on whether a positive or negative photo resist is used). Thus, as shown in FIG. 12 the etching resistant material 1201 is applied to parts of the wafer surface 200' in a pattern of parallel strips 1211 wherein the centers of the strips 1211 are distanced by the grating period d, and wherein exposed parts of the wafer surface 200' are formed between the strips 1211.

The photo resist is subsequently developed resulting in a pattern of parallel lines of photo resist covering roughly the SiN etching resist at areas where the dams are to be created (see FIG. 12). Subsequently, a reactive ion process is used to etch away the exposed areas of the SiN layer. After this the remaining photo resist may be removed. The resulting pattern of etching resist 1201 is as shown in FIG. 12. In a subsequent process an anisotropic (wet) etching agent 1202 such as potassium hydroxide (KOH) is applied to the master surface. Other etching agents and/or method may be employed insofar as they provide anisotropic etching rates, i.e. different rates in different directions of the crystal. At areas not covered by the etching resist 1201, the silicon wafer is etched away from the surface downward. Now because of the crystal structure of silicon the etching process will be anisotropic, i.e. not the same in all directions. In particular, the anisotropic etching agent etches about a factor of 100 times faster (depending on temperature, see e.g. U.S. 2008/0230947) in a direction perpendicular to the <100> crystal plane than in a direction perpendicular to the <111> crystal plane. With reference to FIG. 12, an anisotropic etching process is applied to the wafer surface 200' that etches faster in a direction normal to the third crystal plane 100 than in a direction normal to the first and second crystals planes 111a, 111b to form the grooves 1210 at the exposed parts wherein the flat interfaces of the grooves are formed along the first and second crystal planes 111a, 111b.

Figure 13:
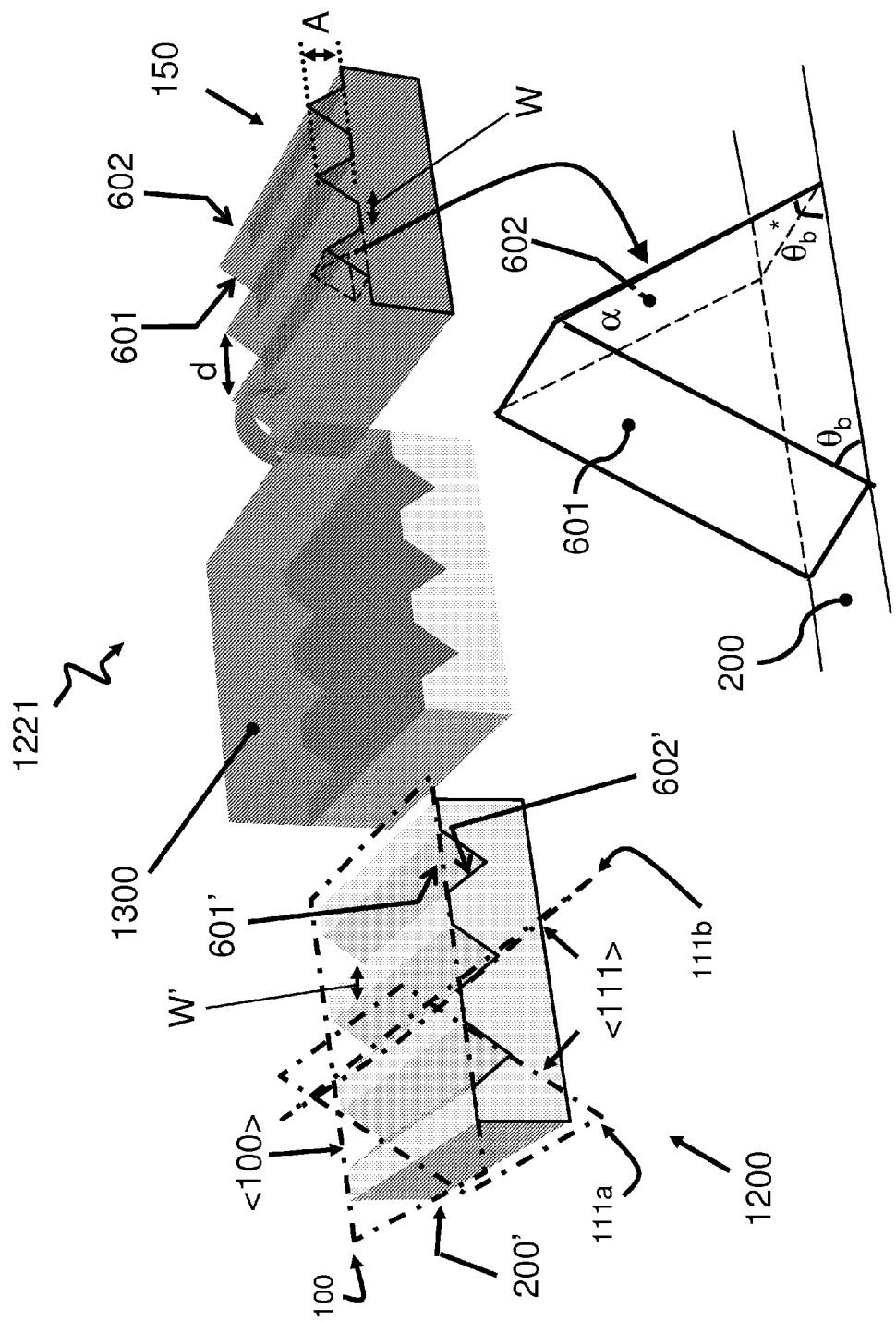
FIG. 13 shows a schematic of the method of FIG. 12.

The resulting groove pattern thus has edges that are mostly parallel to the <111> crystal planes (see FIG. 13). Due to the relative orientation of the crystal planes in silicon this results in a groove angle of about 70.5 degrees, e.g. between 65 and 75 degrees plane angle. The etching process is allowed to proceed until the edges of the etching resist are reached thus resulting in a dam width substantially equal to the line width of the etching resist. After the etching process is stopped, the etching resist 1201 may be removed, e.g. using hydrogen fluoride (HF) or other compound that etches silicon nitride faster than silicon. Although a particularly advantageous method for creating a grating master with desired characteristic is described above other known methods may be employed to reach the same resulting grating master.

Once a grating master 1200 is thus obtained, the master 1200 may be replicated in an inverting replication step 1221. This inverting replication step 1221 may comprise e.g. providing a work piece with a moldable surface such as a non hardened resin. The moldable surface is pressed into the groove and dam structure of the grating master, whereby the moldable surface obtains a shape complementary to that of the grating master surface. The resin is subsequently hardened, e.g. by cooling, and the work piece is removed from the master 1200 thus forming a replica 150.

Alternative to the moldable surface, e.g. a liquid (epoxy) resin may be used to fill in the grooves of the grating master 1200. This liquid resin may be subsequently hardened to form a work piece similar as before. After a replica 150 is thus obtained a metal layer may be applied and/or deposited onto the replica with any known techniques such as chemical vapor deposition, atomic layer deposition, epitaxial film growth, sputter deposition, etcetera. After the reflective metal layer is applied, a diffraction grating is finally obtained. It is noted that in particular cases wherein the moldable surface is itself reflective no further metal coating may be necessary.

Further details on anisotropic etching methods of silicon and replicating a grating from a master wafer are given e.g. in U.S. 2008/0230947 by Chou et al. The replication of gratings is also discussed e.g. in the "*Diffraction Grating Handbook, sixth Edition*" by Newport. Besides anisotropic etching, also other methods such as ruling may be used to produce a grating with flat cavity bottom faces and protruding ridges such as shown e.g. in FIGS. 5 and 6. However, the proposed anisotropic etching method is particularly well suitable not only for carefully controlling the corrugation amplitude of the resulting grating ridges, but also e.g. for easily adjusting the blaze angle by choosing a different cut. E.g. in case of ruled gratings, the blaze angle is typically dependent on the shape of the tip that traces the grooves in the grating master. Furthermore, the currently proposed etching method provides a very smooth grating surface that has low stray light scattering characteristics compared to any state-of-the art grating. In particular the smooth surfaces can be used to form the flat reflective interfaces of the grating. The term "flat interface" refers to the fact that the interface is not significantly curved with respect to the size of the interface. A definition of a flat interface may be e.g. that the radius of curvature over the interface is more than 2 times the height of the interface (from bottom to top along the interface), preferably more than 5 times, more preferably more than 10 times. In particular a grating with a continuous sinusoidal or near sinusoidal corrugation is not considered to have a flat interface or a well defined blaze angle.

Accordingly, in an advantageous embodiment there is provided a wafer comprising a substantially mono-crystalline material in an orientation 1251 defined by crystal planes shown e.g. in FIG. 13 as the <100> and <111> crystal planes). The wafer comprises a surface 200' that forms a cut angle with respect to the crystal planes; a surface 200' of the wafer provided with an etching resistant material 1201 in a pattern of parallel lines having a particular line width, the centres of the lines distanced by a line period d which corresponds to the grating period d.

Advantageously, using a manufacturing method based on etching of silicon in principle atomically flat interfaces can be obtained.

FIG. 13 shows in a schematic overview of a method for creating a replica grating 150 from a silicon grating master 1200. The <100> and <111> crystal planes are shown in the grating master 1200. In silicon the angle between the <100> and <111> crystal planes is about 70.6 degrees. The angle between the <111> crystal planes (111a and 111b) is about 54.7 degrees In an inverting replication step 1221, a replica grating 150 is obtained. In the replication process a moldable material 1300 such as a resin is applied to the grating master 1200 to form a surface of the grating to be created. In a subsequent step the moldable material is separated from the grating and a metal layer may be applied to the grating structure to form a conductive interface of the grating.

In the current figure the cut surface of the grating master 1200 corresponds to the <100> crystal plane. For this cut a symmetric groove pattern is obtained. The resulting replica grating will have a blaze angle of about 54.7 degrees. In this case the conjugate blaze angle equals the blaze angle and the grating will have symmetric ridges.

Alternatively, e.g. for a cut along the <112> crystal plane (shown e.g. in FIG. 22), a blaze angle θb of about 19.4 degrees can be obtained, with a conjugate blaze angle θb* of 90 degrees.

In general, by choosing a particular cut angle of the wafer with respect to the crystal orientation any other desired blaze angle $\theta_b$ may be achieved wherein the blaze angle is determined by the angle between the <100> or <111> crystal planes and the surface along which the cut is made. Accordingly there is provided a wafer comprising a substantially mono-crystalline material in an orientation defined by the <100> and <111> crystal planes, the wafer comprising a surface 200' that forms a cut angle of 0 degrees with respect to the <100> plane and of about 54.7° with respect to the <111> crystal plane.

The groove angle on the other hand depends on the relative orientation of the <111> and <111> crystal planes which for silicon is about 70.5 degrees. This will also approximately be the apex angle α of the ridges in the replica 150. The dam width will correspond to the cavity width W and the corrugation amplitude A will correspond to the groove depth.

From geometrical considerations it can easily be shown that the relation between the corrugation amplitude A, cavity width W, grating period d, blaze angle $\theta_b$, and conjugate blaze angle $\theta_b^*$ is given by:

$$d = W + A/\tan(\theta_b) + A/\tan(\theta_b^*). \quad (E3)$$

Thus it is to be understood that throughout this text where a cavity width is varied also the corrugation amplitude is varied, at least when all other parameters are the same. In particular for the same period d and blaze angles $\theta_b$, $\theta_b^*$, larger cavity widths W correspond to smaller corrugation amplitudes A. Thus the two terms A and W are interchangeable using the provided transformation relation above. Of course instead of the conjugate blaze angle $\theta_b^*$, we may also substitute the apex angle α by using the goniometrical relation $$\theta_b + \theta_b^* + \alpha = 180°. \quad (E4)$$

Figure 14:
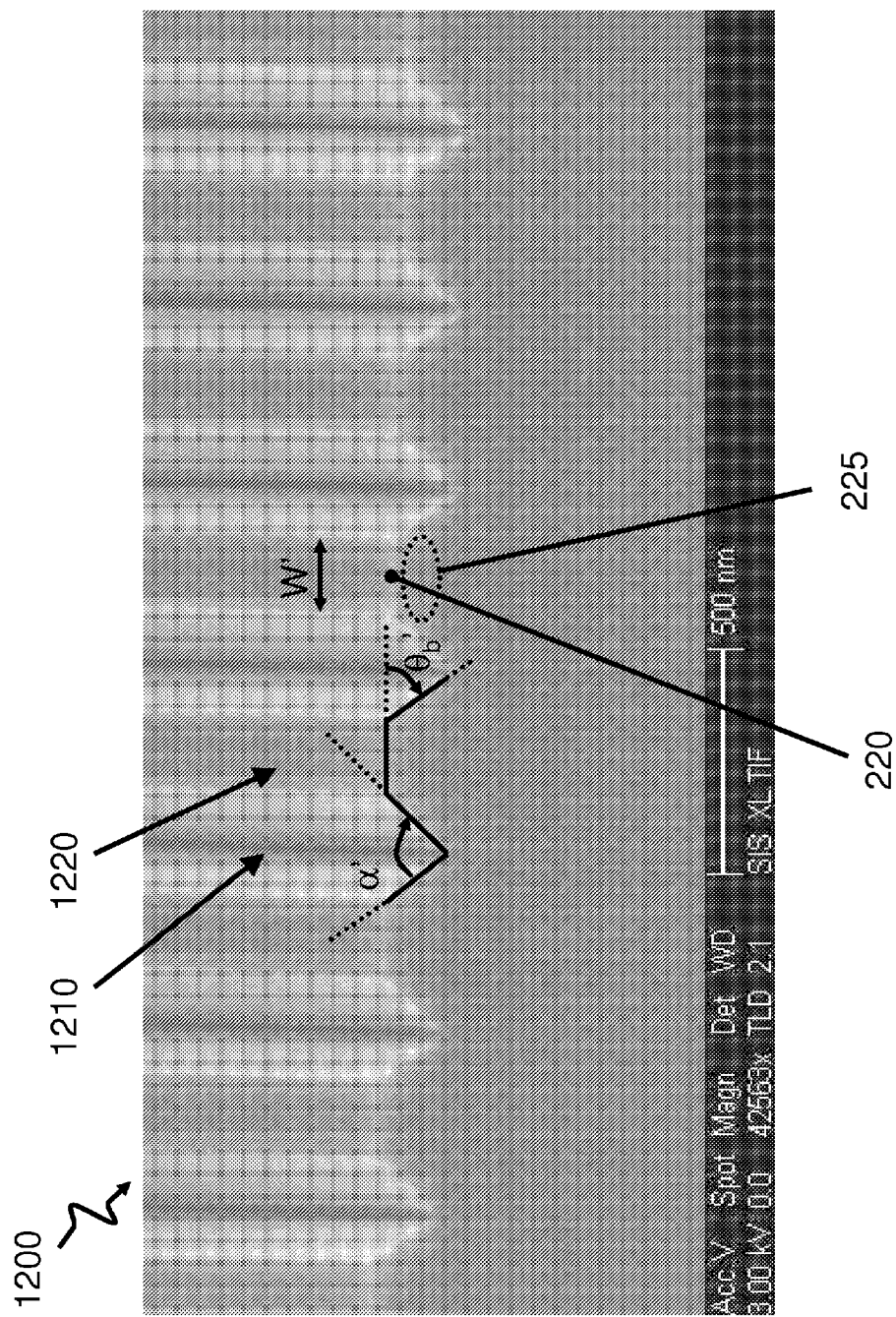
FIG. 14 shows an electron microscope image of a master mold.

FIG. 14 shows an electron microscope image of a silicon grating master 1200. The grooves 1210 and dams 1220 are shown from a bird-eye perspective. The grating period is about 600 nm. Also shown are the groove angle α' and the groove blaze angle $\theta_b'$.

The dam width W defines a cavity (bottom) width. As detailed above in FIG. 8, an electromagnetic field configuration may be formed in the cavities having the cavity bottom faces. In an advantageous embodiment the cavity width W (or equivalently, as noted above, the corrugation amplitude A) is set in accordance with a desired diffraction efficiency resulting thereof.

In some embodiments the grating master 1200 is used as an immersion grating. In that case, cavities 225 with cavity bottom faces 220 will be formed on an inside of the grating master between the grooves 1210, i.e. within the optic medium of the grating master functioning as immersion grating.

In other embodiments the grating master may be replicated to form a front surface grating such as shown in FIG. 13 with a pattern of ridges complementary to the pattern of grooves of the master. In that case cavities will be formed on an outside of the front surface grating between the said ridges in the optic medium outside the grating master, for instance, air or vacuum. The cavity bottom may thus be formed by a dam such as shown in FIG. 14 or a valley such as shown in FIG. 8.

Figure 15:
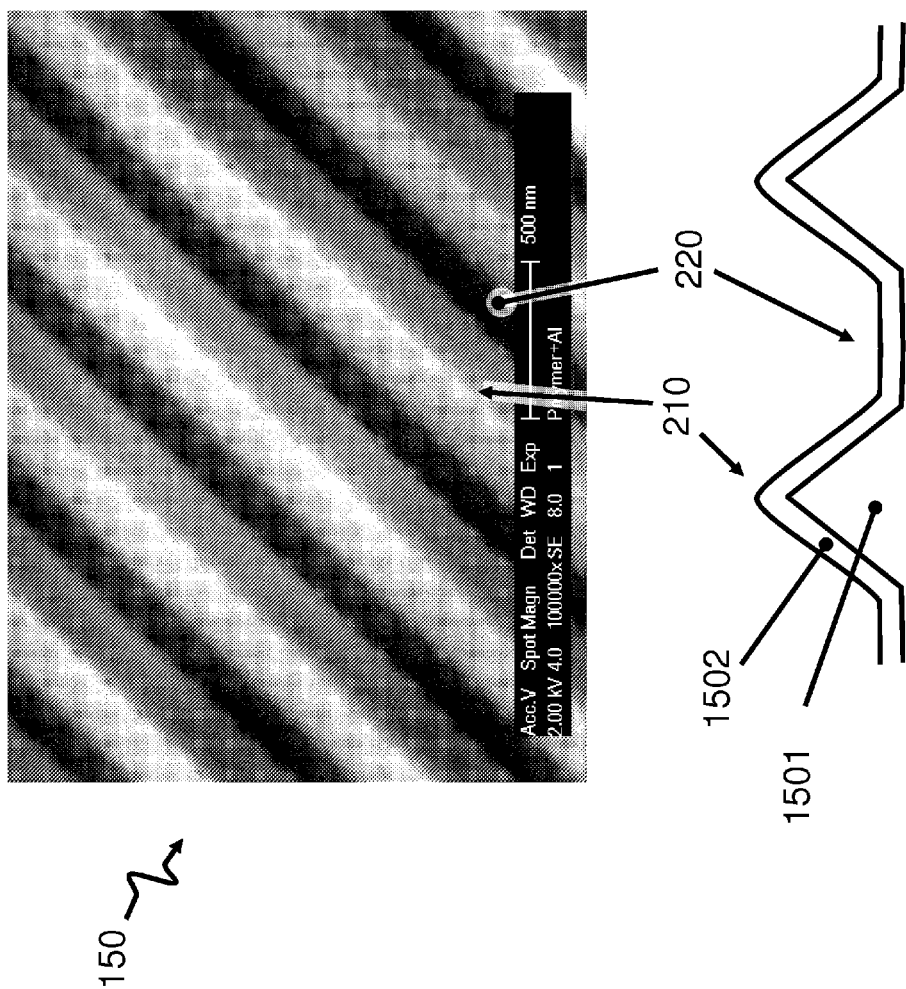
FIG. 15 shows an electron microscope image of a replica grating.

FIG. 15 shows an electron microscope image of a replica grating that may be obtained by replicating a silicon grating master such as shown in FIG. 14 and subsequently applying a layer of metal 1502, e.g. aluminum, gold, silver or other metal having an appropriate reflectance and SPP conductance in the frequency region of interest. In other words the metal layer 1502 forms a conductive interface at a surface of the grating. It may be observed that while the replica material 1501 may have a sharp apex angle, this sharpness may be somewhat diminished by the applied metal layer 1502. More importantly, it may be observed that the cavity width of the grating may be somewhat smaller than the cavity width of the replica due to the metal layer 1502. Although this effect may be minimal, it may also be compensated, e.g. by taking into account the thickness of the metal layer to be deposited when designing the dam width of the grating master.

The inventors found during measurements on gratings created from an etched silicon master that, besides providing a convenient method for varying the cavity width, the resulting grating also provides a surprisingly low stray light scattering that is close to a theoretical minimum for stray light, corresponding to the stray light due to the finite number of illuminated grooves. A reason for this may be that the silicon is etched along the crystal planes, resulting in almost zero roughness. The replication process may add some roughness, but when done properly this added roughness may be negligible. This means that the silicon-based method not only results in higher efficiencies, but also in lower stray light due to lower roughness. A lower stray light will lead to higher quality spectral images, since the stray light from one frequency does not interfere with the image of another frequency.

During inspection by the inventors, etched Si samples of gratings produced according to the presently disclosed method were analyzed with atomic force microscopy (AFM) to determine the surface roughness of the side slopes of a groove. The measurements were performed with a VEECO Dimension 3100 SPM, using a Si probe in the tapping mode. Areas of 800×800 nm$^2$ were scanned. The resulting height data showed rms (root-mean-square) roughness coefficient Rq <1.5 nm. Accordingly, in an advantageous embodiment the flat interfaces (601, 602 or 601',602' in FIG. 13) of the master or copy grating produced according to the methods disclosed herein have a root-mean-square roughness coefficient Rq smaller than 1.5 nanometer FIG. 16 shows an experimental method for optimizing the grating efficiency as a function of the cavity bottom face width W. In particular, the methods provided above in FIGS. 12-15, provide a convenient method for quickly designing and developing gratings with any desired cavity width W and/or corrugation amplitude for a given blaze angle and grating period d.

In an advantageous method, a single grating master may be created wherein the groove depth is varied by varying the line width of the etching resist material in the making process of the master. A schematic top view 1600 is provided wherein the etching resist is applied in strips 1211 of varying width, in this case W=0.1 d, 0.5 d, and 0.9 d, i.e. 10%, 50% and 80% of the grating period d. The resulting grating master 1200 has a pattern of varying groove depths $A_1', A_2', A_3'$. When the master is replicated, the replica will have a corresponding range of corrugation amplitudes $A_1, A_2, A_3$ and varying cavity widths W. The cavity width is constant for a number of grooves that are part of sub areas 1601, 1602, or 1603 of the grating. In an advantageous method a grating 150 is thus created with areas of differing cavity widths. A scanning beam of light such as a laser of a particular wavelength for which the grating 150 is to be optimized may be scanned over the variable cavity width surface, e.g. first impinging area 1601, then 1602, then 1603, and the efficiency may be measured for the different areas, e.g. by a sensor placed in an imaging plane. E.g. a spectrograph setup such as shown in FIG. 3 may be employed whereby, the grating is scanned laterally, i.e. in a direction parallel to the grating surface. Preferably, the beam of incoming light is narrow enough such that only a sub area with a particular cavity width is illuminated.

In such a way a test grating may be used to experimentally optimize the cavity width W such that a desired, e.g. optimal, efficiency is acquired. Once the optimal cavity width is established, a second grating may be produced with that particular cavity width.

The shown range and/or the step size is illustrative and in reality may be chosen systematically e.g. between cavity widths of 10%-90% in steps of 5%. The process may also be iterative, e.g. first establishing a ballpark estimate of an optimal efficiency cavity width by a rough scan e.g. using a 10% interval, and repeating with a 1% interval in an area where the highest efficiency was found in the rough scan.

It is thus illustrated above that the diffraction efficiency of a grating with a profile comprising tapered structures forming cavities bottoms in between can be optimized as a function of the cavity width. An advantage is that this optimization can be done independent of the grating period and using convenient etching techniques. Similarly it is illustrated how the corrugation amplitude $A_1, A_2, A_3$ may be controlled by controlling the width W of the strips 1211.

As non-limiting illustrations of the widespread application of the above demonstrated principle wherein a desired grating efficiency may be obtained by tuning the cavity width of a V-shaped groove or ridge profile such as shown e.g. in FIGS. 12-16 the following examples in FIGS. 17-21 are provided.

Figure 17:
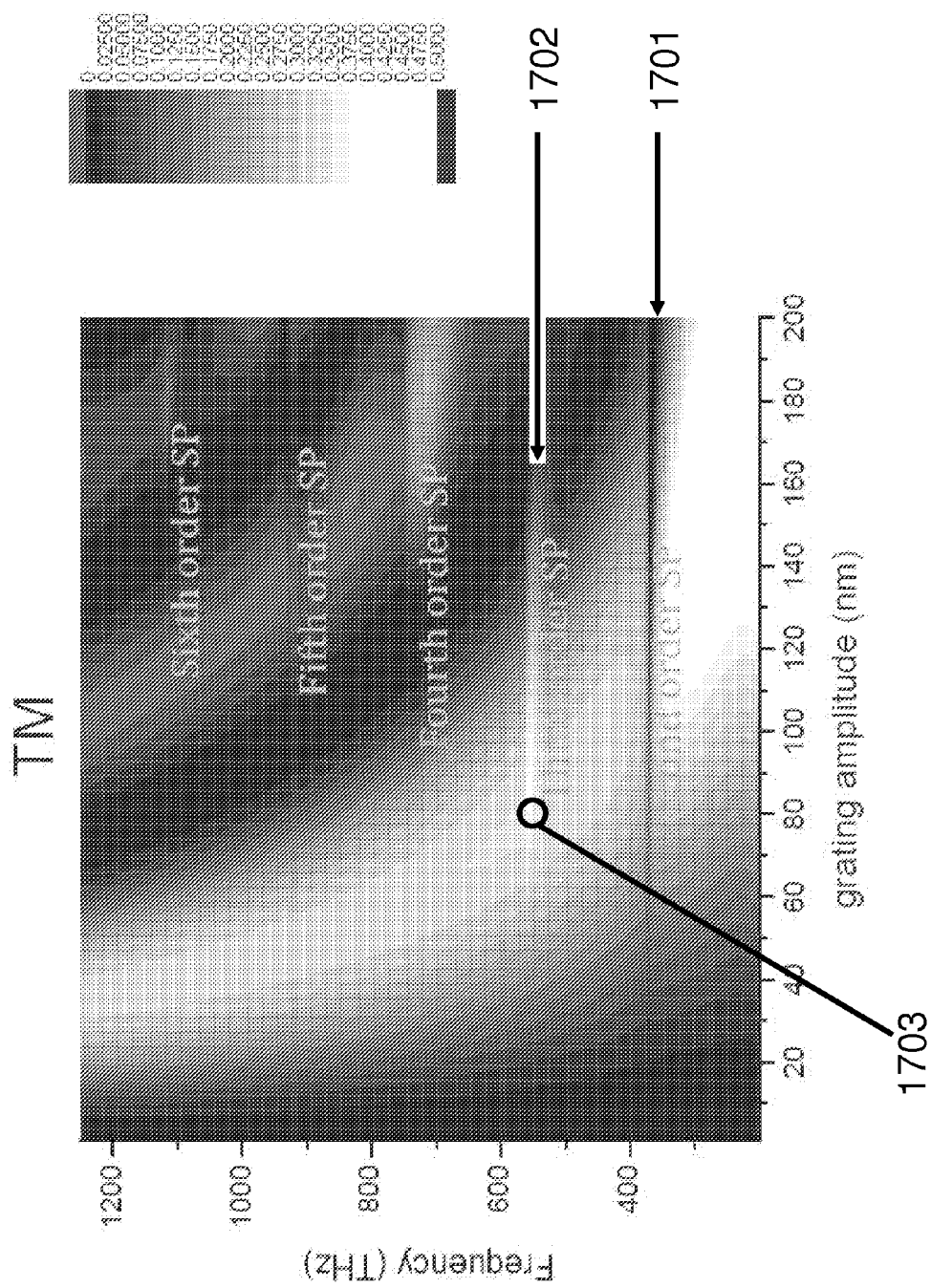
FIG. 17 shows a graph of grating efficiency as a function of grating amplitude and light frequency.

FIG. 17 shows a simulation of efficiency in diffraction order m=1. Light colours correspond to higher efficiency and dark colours to lower efficiency. Besides the regular efficiency profile the inventors also noticed a series of narrow resonances that are attributed to surface plasmon effects. In particular it is observed for a particular frequency around 380 THz indicated by arrow 1701 that the occurrence of surface plasmons may lead to a decreased efficiency of the grating. Such a decreased efficiency may occur e.g. if energy of the impinging light is coupled to the surface plasmons in the grating, wherein the energy is dissipated on the grating surface or refracted in other direction. Surprising however is the fact that at another order of the surface plasmon resonance (indicated by arrow 1702), there is actually an increase of the grating efficiency. For the current example this is the third order plasmon resonance, in other embodiments the enhanced efficiency may occur at other orders. In a particularly advantageous embodiment, e.g. for the frequency and grating amplitude of point 1703, the enhanced efficiency of the plasmon resonance may be combined with the overall efficiency enhancement due to tuning of the cavity width.

Figure 18:
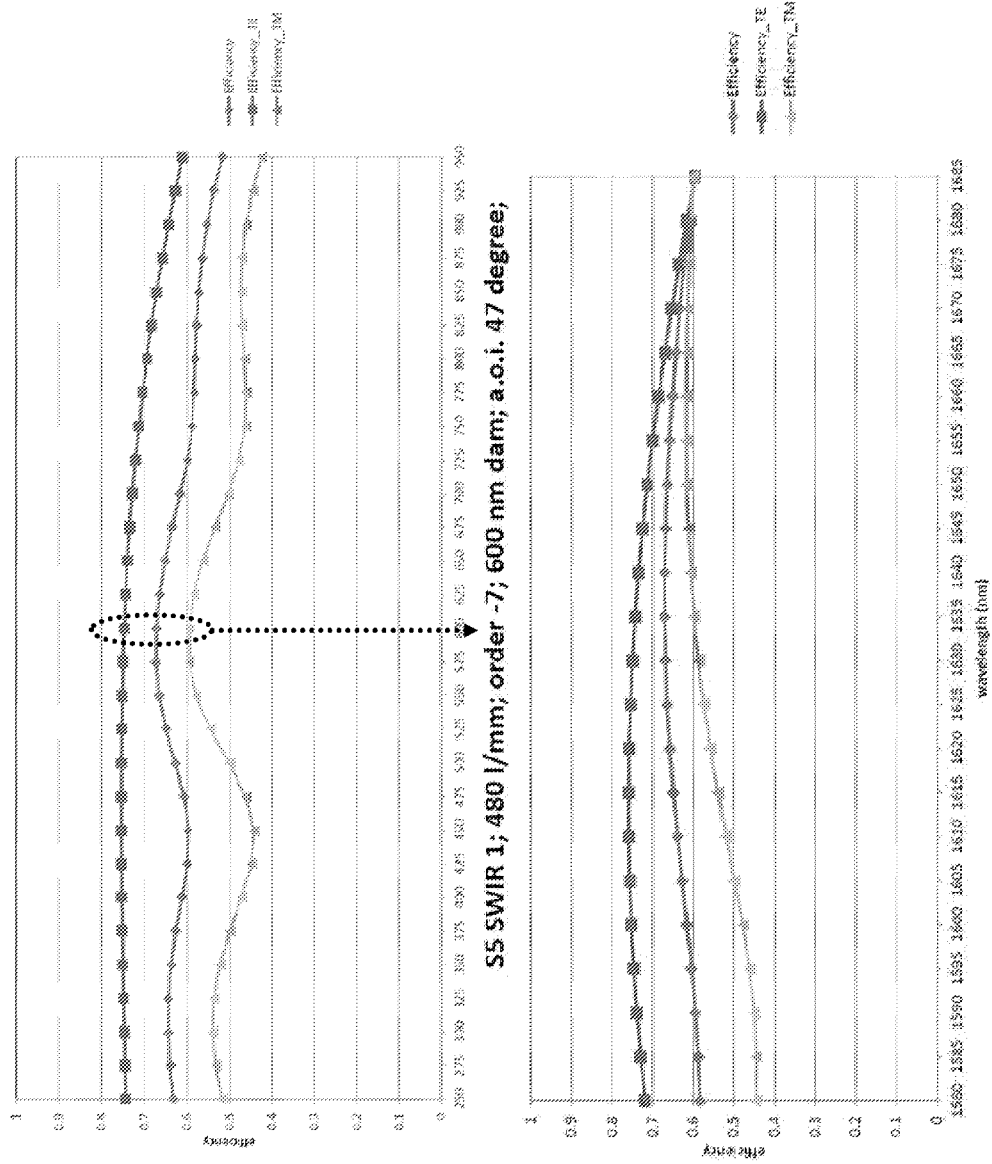
FIG. 18 shows a grating efficiency graphs for a first example.

FIG. 18 shows an example of a non-Littrow immersion grating for use in a CO2 detecting satellite with the following characteristics:
wavelength range 1590 nm-1675 nm,
the line density 480 l/mm,
Diffraction order –7
Angle of incidence 47°
Dam width 250 nm-950 nm
Coating Aluminium
Medium Silicon As may be observed in graph 2101, an optimal overall efficiency is reached e.g. for a dam width of 600 nm.

It is noted that this example concerns an immersion grating, i.e. a grating wherein the impinging light hits the grating from the inside. This is possible since silicon is transparent for the given wavelength range. It is thus noted that the above discussed principles of varying the cavity width equally apply for an immersion grating wherein the elongated protruding structures are in fact grooves as seen from the outside of the grating. The cavity in this case is formed inside the silicon material and the cavity bottom face is formed by the dam top. The dam width thus corresponds to the cavity width. It is noted that whereas in the current example a layer of aluminium was applied, the application of a reflective layer to the grating substrate is not always necessary, e.g. in case the interface of the substrate material, in this case silicon, already provides a reflective interface.

Graph 2102 shows the grating efficiency as a function of wavelength for a dam width of 600 nm. It is shown that the unpolarized efficiency >60% everywhere in the given frequency range. The polarization goes from 2% at 1675 nm up to 24% at 1590 nm. Furthermore is was calculated that the angular dispersion goes from 53.7° to 63.0°.

Figure 19:
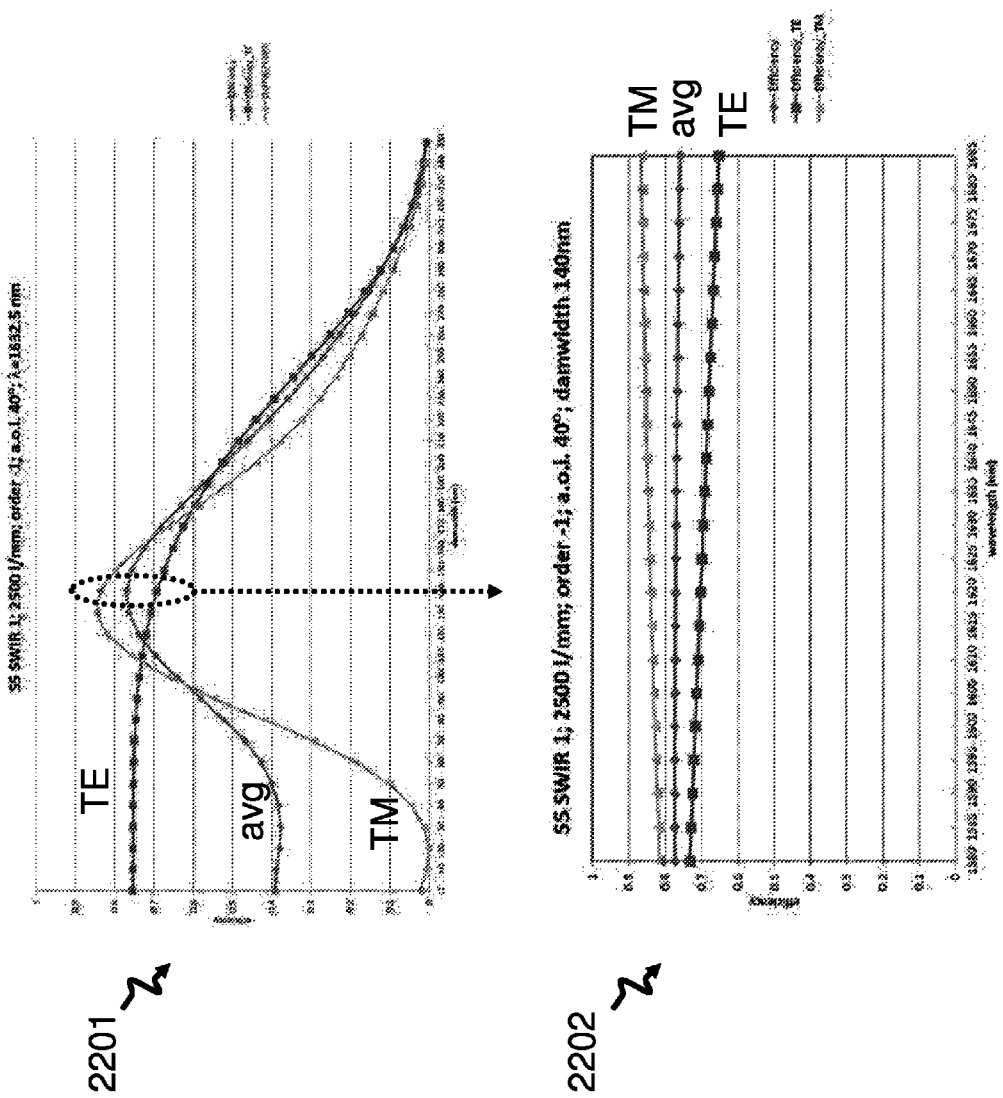
FIG. 19 shows a grating efficiency graphs for a second example.

FIG. 19 shows another example of a non-Littrow immersion grating for a CO2 detecting satellite with the following characteristics:
Wavelength range 1590 nm-1675 nm
Line density 2500 l/mm
Diffraction order –1
Angle of incidence 40°
Dam width 0 nm-350 nm
outgoing cone 30°-34°
Coating Aluminium
Medium Silicon Graph 2201 shows the grating efficiency as a function of the dam width (i.e. the cavity width). It may be observed in graph 2201 that whereas the transverse electric (TE) efficiency goes down with increasing dam width, the transverse magnetic (TM) efficiency has a maximum value around 130 nm. The overall average (avg) efficiency is highest around a dam width of 140 nm. The effect of the decreasing TE efficiency may be explained by the shadow effect described also in FIG. 5, i.e. because more light directly hits the bottom of the grating and is simply reflected in the zero order. On the other hand the TM efficiency experiences an enhancement, presumably due to the fact that the cavity shape and size provide a resonance for the more deeply penetrating TM radiation (wiregrid effect), and this resonance provides an enhanced efficiency, e.g. through the previously discussed mechanism of the local field amplitudes. Finally, as the dam width is increased even further, i.e. >130 nm, also the efficiency for TM radiation goes down, probably due to the competing shadow effect of FIG. 5.

Graph 2202 shows the grating efficiency as a function of the wavelength for the optimal dam width (140 nm). It is observed that the overall grating efficiency >75% over the whole wavelength range while the. Polarizing effect (i.e. difference between TE and TM efficiencies) stays between approximately 6% and 13%. Such a low-polarizing grating provides the advantage that minimal unwanted polarization anomalies are introduced in the optical system.

Figure 20:
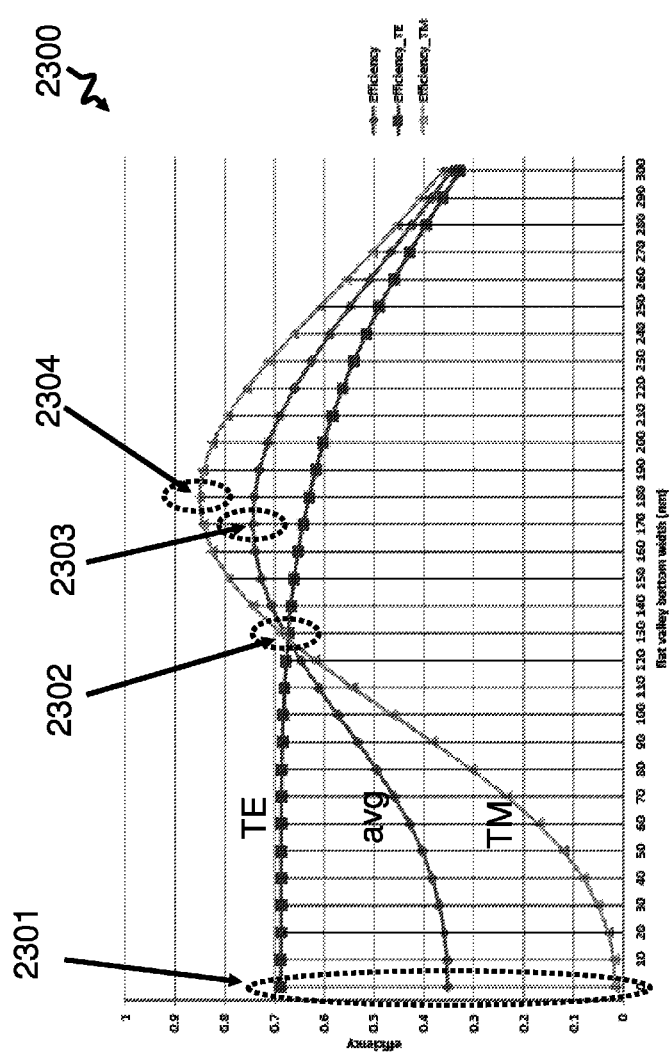
FIG. 20 shows a grating efficiency graphs for a third example.

FIG. 20 shows an example of a non-Littrow front surface (as opposed to immersion) grating for use in a visible wavelength range with the following characteristics:
Grating period 500 nm
Dam width 0 nm-300 nm
Blaze angle 54.74°
Angle of incidence 42°
Metal 100 nm Aluminium (Palik handbook)
Resin Resin_1-mkm_Vis-NIR_RG-Newport
Wavelength 605 nm The graph 2300 shows the grating efficiency as a function of the flat valley bottom width (i.e. the cavity width). The following points of interest are noted. For a width of 0 nm (arrow 2301) a maximally polarizing grating is obtained. For a width of 130 nm (arrow 2302) a virtually non-polarizing grating is obtained. For a width of 170 nm (arrow 2303) a maximum overall efficiency is obtained that can be obtained by a variation of the cavity width for the current profile and settings. For a width of 180 nm (arrow 2304) a maximum efficiency is obtained for polarized (TM) light. It is noted that this polarized efficiency is higher than the overall efficiency.

Figure 21:
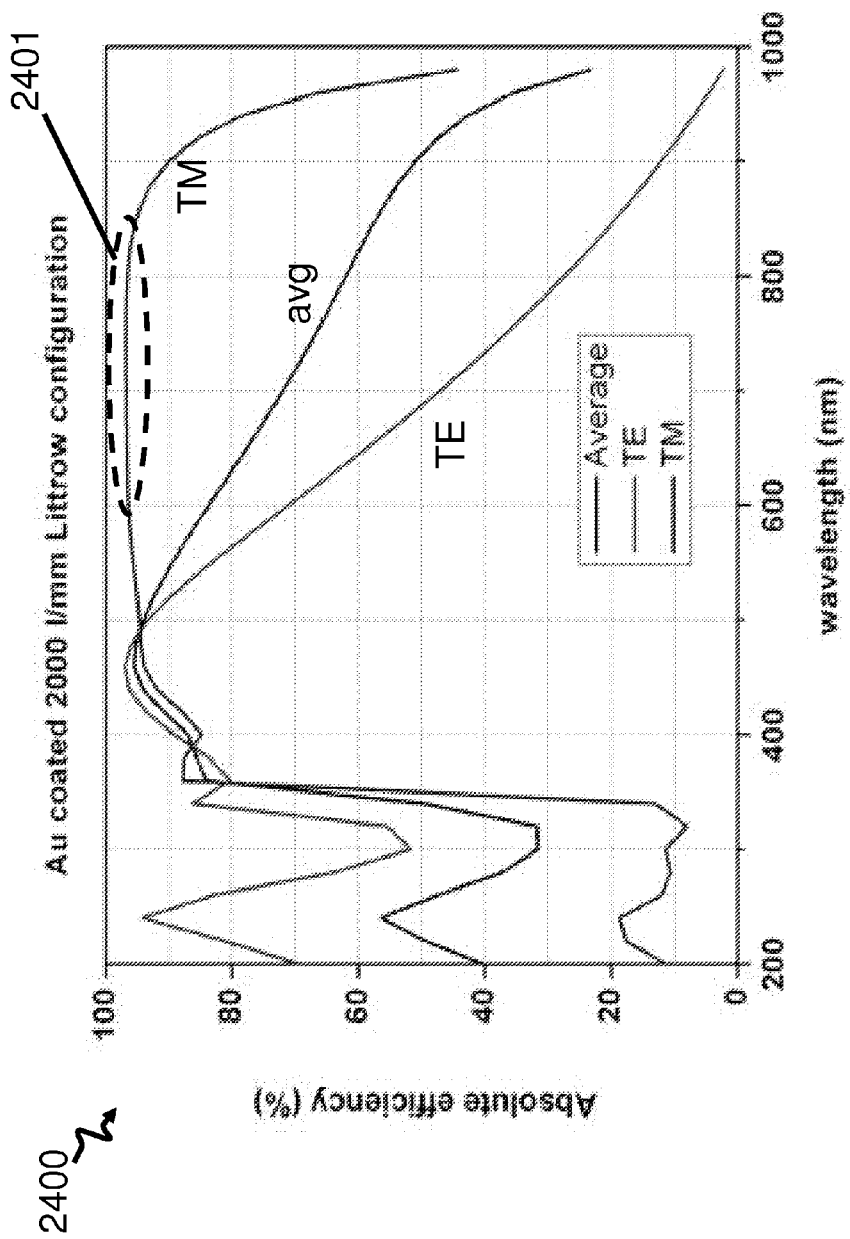
FIG. 21 shows a grating efficiency graphs for a fourth example.

FIG. 21 shows a Littrow grating with the following characteristics:
Grating period 500 nm
Dam width 175 nm
Blaze angle 54.74°
Angle of incidence: variable (depending on wavelength)
Metal 100 nm Gold (Palik handbook)
Resin Resin_1-mkm_Vis-NIR_RG-Newport
Wavelength 200-980 nm Graph 2400 shows that the grating has a very high efficiency of >95% for TM light over a wide wavelength region 2401. The shown characteristics make the provided grating well suited for use as a frequency selective back reflector in a laser cavity such as shown in FIG. 4. In particular by rotating the grating various wavelengths in the provided range may be selected. A suitable laser may e.g. be a (TM) polarized Ti:sapphire laser (also known as Ti:Al2O3 laser, titanium-sapphire laser, or simply Ti:sapph). In a further advantageous embodiment a Littrow grating such as disclosed in FIG. 21 is used in a laser cavity of an atom clock, e.g. at the Rb D2 line 1=780.2 nm. The grating is thus used for wavelength stabilization.

Figure 22:
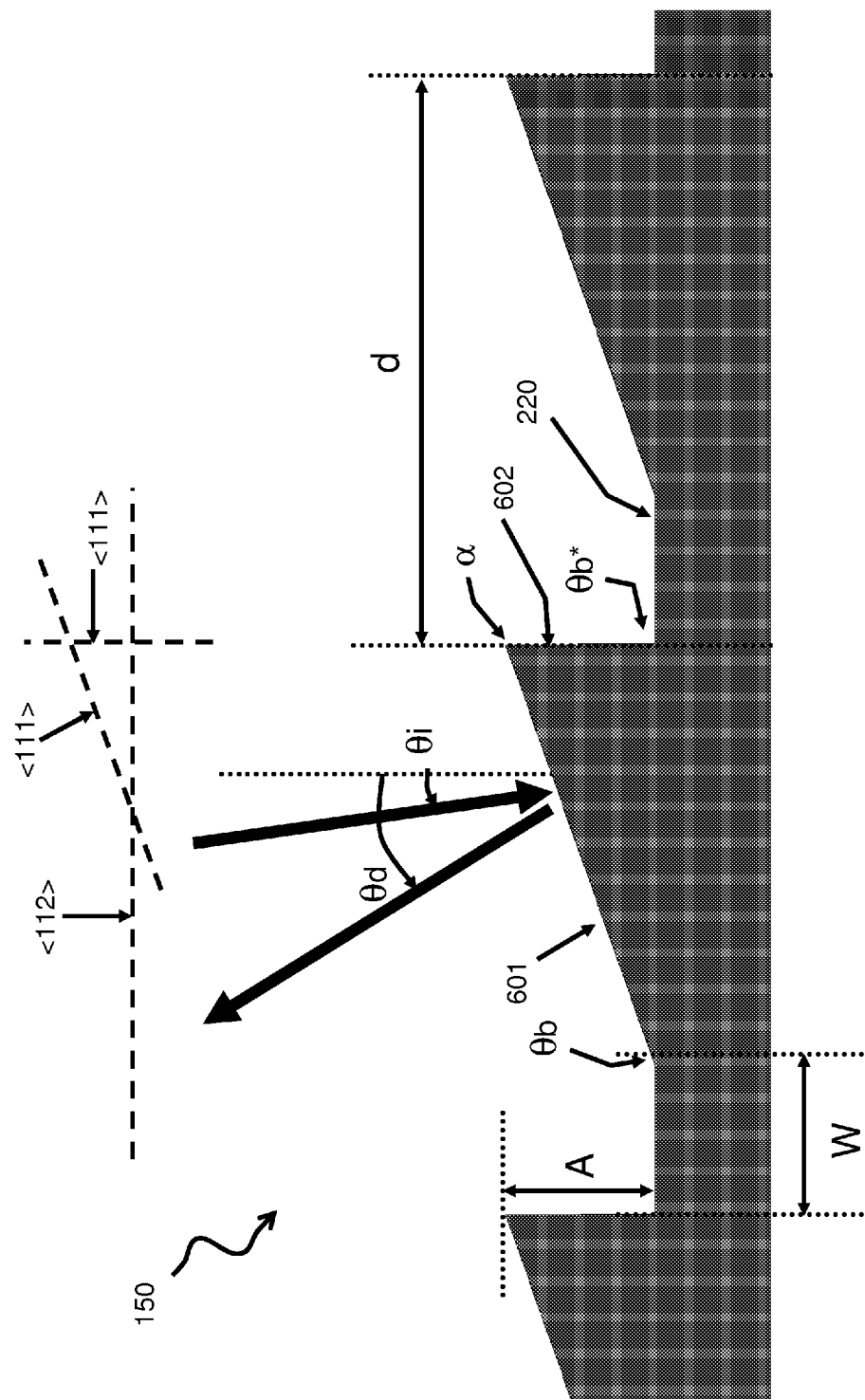
FIG. 22 shows an embodiment of a diffraction grating.

FIG. 22 shows a side view profile of another embodiment of a diffraction grating 150. The grating has period d=500 nm and apex angle α of about 70.6 degrees. The grating may be suitable for operating in a wavelength region of 300 nm. The grating comprises a blaze angle θb=19.4 degrees. The supporting wall 602 has an angle θb*=90 degrees. The preferred angle of incidence θi=3 degrees. This may result in a diffraction angle θd=−34 degrees in diffraction order −1. In accordance with a desired diffraction efficiency, the corrugation amplitude A and bottom face width W for this configuration are calculated. In this embodiments, both A and W are about equal at 130 nm. In the embodiment, the supporting walls 602 are in the shadow, however, the bottom planes 220 are almost entirely illuminated. Surprisingly this need not have an adverse effect on the efficiency.

As described above, the grating may be manufactured through replication of a master grating manufactured using anisotropic etching of a silicon wafer cut along the <112> crystal plane. The cavity bottom 220 corresponds to the <112> crystal plane along which the master grating was cut. The flat interfaces 601, 602 correspond to the <111> crystal planes of the master grating.

Before the anisotropic etching, strips of etching resist material may be applied to the silicon wafer, e.g. using the above mentioned SCIL technique. The width of the resist patterns is used to determine the width of dams between V-grooves of the master grating. The strips may be about 130 nm wide leaving exposed parts between neighboring strips of about 370 nm. The grooves are etched on the exposed parts using anisotropic etching. When the grooves reach a point at the bottom of the V, the etching process may automatically halt or at least slows down dramatically due to the nature of the anisotropic etching process. The depth A and width W of the dams are thus determined by the width of the strips. After copying of the master grating, the dams become the bottom faces 220. It is to be appreciated that the width W of the bottom plane 220 may influence the efficiency and polarization performance of the grating 150. Therefore the homogeneity of the width W is preferably well controlled.

Figure 23:
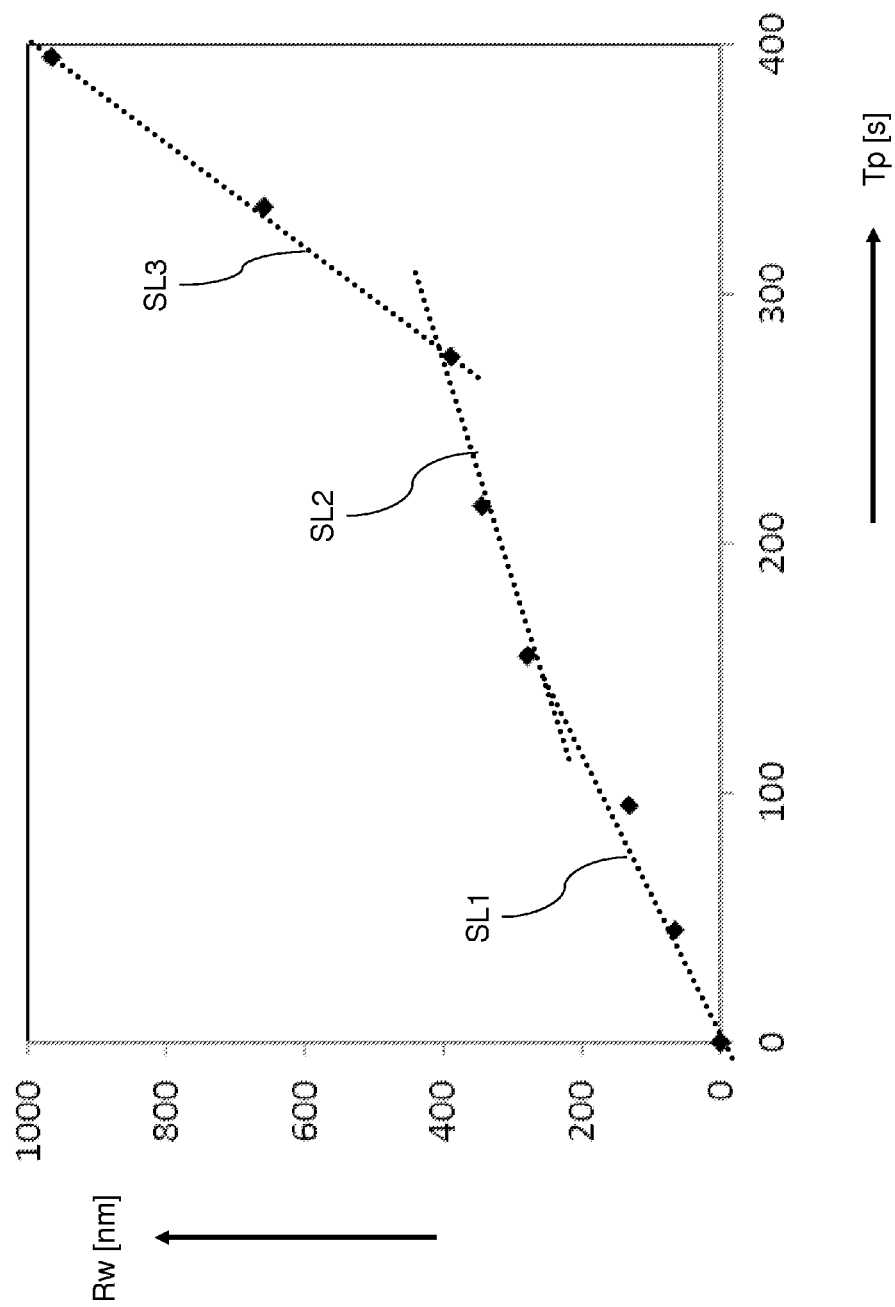
FIG. 23 shows an embodiment of a method for manufacturing gratings.

FIG. 23 shows a graph of the measured reduction Rw in resist line width (in nanometers) as a function of time Tp (in seconds) upon plasma etching. Three slopes may be roughly discernible:
SL1: 0-125 s etching in photoresist and bottom anti-reflection coating,
SL2: 125-300 s etching in photoresist only and
SL3: 300-400 s etching in bottom anti-reflection coating only.

Using this etching method the grating line width may be accurately controlled. This allows for accurate tuning of e.g. the grating polarized efficiency.

Accordingly, in a further embodiment of the method according to the first aspect, the width of the resist lines (i.e. the pattern of parallel strips) is narrowed using Reactive Ion Etching (RIE). The technique of RIE may provide further control over the line width of the etching resist strips. RIE may be used in combination with SCIL to provide further improvements in homogeneity and/or coherence of the strips.

Figure 24:
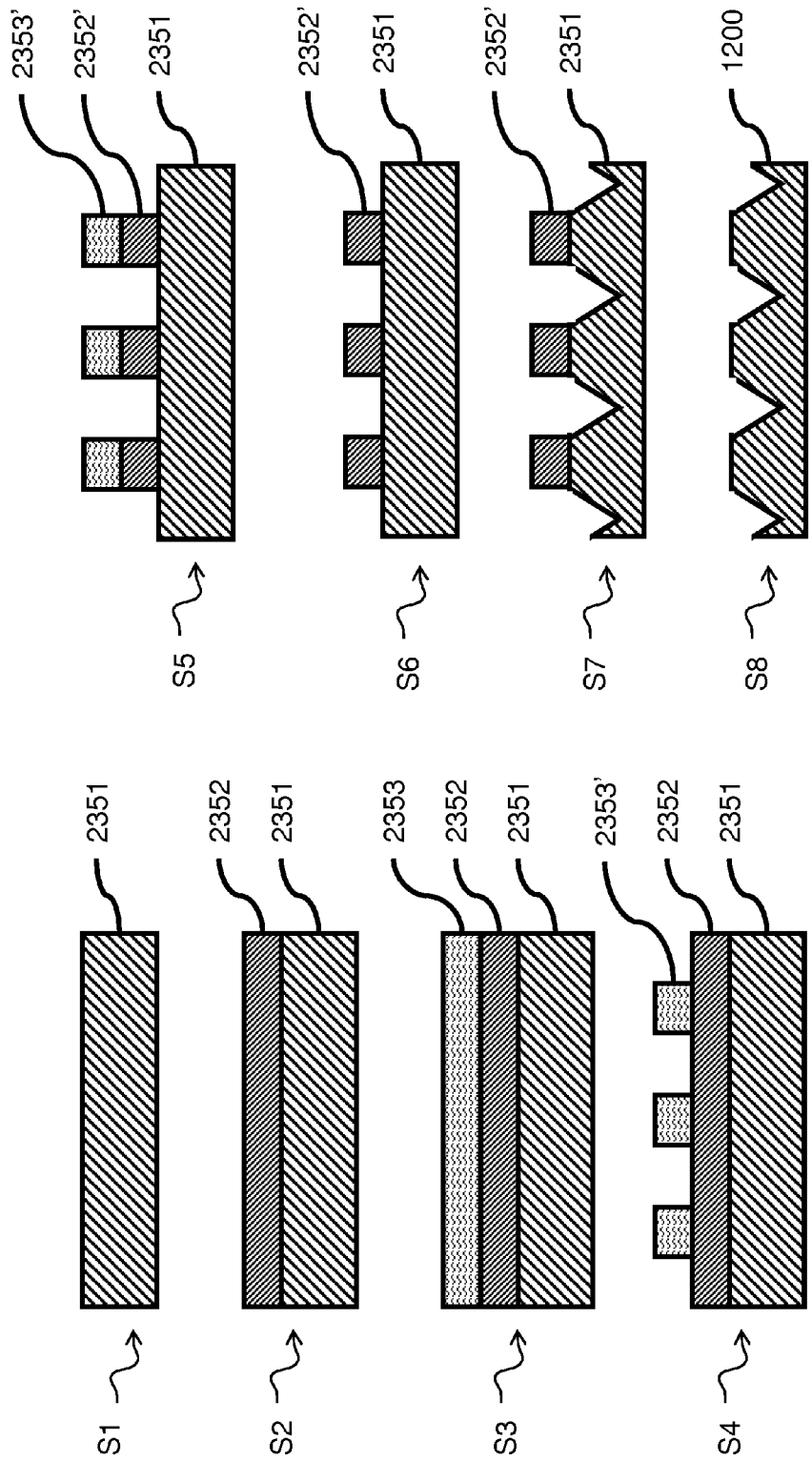
FIG. 24 shows a specific embodiment of a method for manufacturing a master grating.

FIG. 24 shows a specific embodiment of a method for manufacturing a master grating 1200 in accordance with the above description, e.g. with reference to FIG. 12.

In step S1, a silicon disk 2351 (i.e. the wafer) is polished to lambda/50 rms flatness. In step S2, a layer 2352 of 100 nm Silicon nitride is deposited using low pressure chemical vapor deposition (LPCVD). Depending on the grating period, it may be preferred to use UV lithography or imprint lithography.

For grating periods >1 micrometer, in step S3 a photo-resist layer 2353 is added using spin coating. In step S4 the photo-resist layer 2353' is patterned using UV lithography. In step S5, the pattern is transferred into the silicon nitride layer 2352' by plasma etching. In step S6, the photo-resist layer 2352' is removed, leaving the patterned silicon nitride layer 2352'. In step S7, the silicon disk is anisotropically etched using KOH. In step S8, the silicon nitride mask 2353 is removed in HF and a grating 1200 is optionally cut out of the silicon disk.

For grating periods <1 micrometer in step S3 a layer of solgel is applied using spin coating. In step S4 imprint lithography (SCIL) is used for patterning. In step S5, the pattern is transferred into the silicon nitride layer 2352' by plasma etching. In the optional step S6, the remaining solgel layer 2352' is removed, leaving the patterned silicon nitride layer 2352'. A master grating 1200 is thus obtained.

Optionally, e.g. as was shown in FIG. 12, a moldable material is applied to the master grating 1200 and separated from the master grating thus obtaining a replica grating. Optionally, a reflective coating is applied to the master grating 1200 and/or the replica grating. While the process has been demonstrated for obtaining a symmetric groove/ridge pattern also asymmetric grooves/ridges may be obtained by tilting the cut angle of the silicon disk with respect to the crystal planes, e.g. as shown in FIG. 22. It is to be appreciated that a corrugation amplitude of the master grating and/or the replica grating may be determined by a width of the resist pattern and using an etching agent having anisotropic etching rates, i.e. different rates in different directions of the crystal, as was demonstrated e.g. in FIGS. 12 and 16. The corrugation amplitude may be determined in accordance with a calculation of a desired diffraction efficiency.

The various elements of the embodiments as discussed and shown offer certain advantages, such as an improved diffraction grating efficiency and/or a method for creating such gratings. The invention covers the practice of presetting the diffraction efficiency by varying the cavity width W and/or the corrugation amplitude A in numerical calculations e.g. by PCGrate® and other simulation programs in accordance with a desired diffraction efficiency. A diffraction efficiency of the impinging light may thus numerically be controlled for the disclosed tapered structures in accordance with a desired diffraction efficiency by setting the cavity width e.g. in a range between 0.1 and 0.9 times the grating period d the cavity width W in such a way that, in use, impinging light will result in an energy flow field in resonance cavities 225 bounded by the cavity bottom faces 220, which electromagnetic field configuration can be calculated as a function of the cavity width W.

For example, PCGrate®-S(X) v.6.4 32/64-bit calculates the diffraction efficiency and near-zone diffraction field for such kinds of 1-D reflection and transmission relief & phase gratings (holographic, ruled, and others) and 1-D & 2-D photonic crystals as those with arbitrary shape multilayer (that have different borders or non-uniform vertical thicknesses along the grating period), variable groove depth or/and space, concave & convex, in conical mounts, irradiated by non-planar waves, in general polarization states, with various periodical & random layers' roughnesses, and in a super wide spectral region. The rigorous boundary integral equation method employed in the analysis of diffraction grating efficiency may be extended to the case of non-periodical structures of any kind and non-function border profiles. A tool for random asperities generating, in particular with Gaussian correlation function, is included with a possibility to add microroughness on one facet (part) of a border profile. A diffraction grating with desired cavity width W and/or corrugation amplitude A can be achieved according to the disclosed method wherein the line width of an etching resist material is controlled in an anisotropic etching process.

Of course, it is to be appreciated that any one of the above embodiments or processes may be combined with one or more other embodiments or processes to provide even further improvements in finding and matching designs and advantages. It is appreciated that this invention offers particular advantages for lasers and spectrographs and in general can be applied for any field of optics where grating efficiency and/or stray light is important.

Possible applications for the currently disclosed methods may be e.g. in low-cost and/or high-volume production of high-efficiency gratings. Such high volume production may open up new areas for the use for such gratings, e.g. uses in telecommunications, wavelength multiplexing, consumer devices e.g. for color determination of paint, furniture, bruise marks etc. In addition, every application that benefits from lower stray light and higher signal in principle benefits from this type of grating. This includes use in a laser cavity to tune to a certain wavelength.

Using the gratings such as disclosed here, the efficiency for a particular polarization state can be up to 90% or higher. This means that all polarization dependent systems could benefit from this grating. For example, a laser system may typically use polarized light, but also scattered light can be polarized. Other uses may include measurement methods to determine aerosol concentrations using a spectroscopic polarizing measurement system, which could benefit largely from this type of grating. In another example, a polarization insensitive high efficiency grating may find application e.g. in a space based spectroscope such as shown in FIG. 1.

Alternatively, also unpolarized light may be diffracted with high efficiency by a polarizing grating e.g. by first splitting the light into two complementary polarizations states and feeding the two light beams having different polarization states into two spectrometers, each with a grating optimized for the corresponding polarization. Alternatively, one of the polarizations that was split off may be rotated to be the same as the other, e.g. using a waveplate or lambda-half plate. The two beams, thus having the same polarization may then be recombined into the same spectrometer and/or diffracted off the same grating.

Finally, the above-discussion is intended to be merely illustrative of the present system and should not be construed as limiting the appended claims to any particular embodiment or group of embodiments. Thus, while the present system has been described in particular detail with reference to specific exemplary embodiments thereof, it should also be appreciated that numerous modifications and alternative embodiments may be devised by those having ordinary skill in the art without departing from the broader and intended spirit and scope of the present system as set forth in the claims that follow. The specification and drawings are accordingly to be regarded in an illustrative manner and are not intended to limit the scope of the appended claims.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item or implemented structure or function; any of the disclosed devices or portions thereof may be combined together or separated into further portions unless specifically stated otherwise; no specific sequence of acts or steps is intended to be required unless specifically indicated; and no specific ordering of elements is intended to be required unless specifically indicated.

The invention claimed is:

1. Method of manufacturing a master grating for diffracting light of a particular wavelength impinging the master grating with a particular angle of incidence, the master grating comprising an array of grooves running in parallel along a planar face of the master grating, the grooves distanced by a grating period; the grooves comprising a triangular profile with flat interfaces, wherein one of the interfaces forms a blaze angle with respect to the planar face; wherein the method comprises providing a wafer comprising a substantially mono-crystalline material, the material having first, second, and third crystal planes, wherein the first and second crystal planes intersect each other at an intersection angle; the wafer being cut along a wafer surface having a cut angle equal to the blaze angle with respect to the first crystal plane;

applying an etching resistant material to parts of the wafer surface in a pattern of parallel strips, the centers of the strips distanced by the grating period, wherein exposed parts of the wafer surface are formed between the strips;

applying an anisotropic etching process to the wafer surface that etches faster in a direction normal to the third crystal plane than in a direction normal to the first and second crystals planes to form the grooves at the exposed parts wherein the flat interfaces of the grooves are formed along the first and second crystal planes;

wherein the method further comprises calculating a corrugation amplitude of the grooves with respect to the wafer surface as a function of a desired diffraction efficiency of the light for the given grating period and blaze angle; and in the applying of the etching resistant material, controlling a line width of the strips such that the grooves are formed with the flat interfaces extending from exposed edges of neighboring strips into the wafer surface and intersecting each other with the intersection angle at a depth equal to the calculated corrugation amplitude.

2. Method of manufacturing a replica grating, the method comprising manufacturing a master grating according to claim 1;

applying a moldable material to the master grating to form the replica grating wherein the replica grating comprises an array of ridges complementary to the array of grooves of the master grating; and separating the replica grating from the master grating; wherein said calculating of the corrugation amplitude is performed as a function of the desired diffraction efficiency of the replica grating.

3. Method according to claim 1 wherein the mono-crystalline material is silicon.

4. Method according to claim 1, further comprising applying a reflective layer to the master grating or to a replica grating of the master grating.

5. Method according to claim 1, wherein the strips of the etching resistant material are provided on the wafer using imprint lithography.

6. Method according to claim 1 wherein, prior to applying the anisotropic etching process, the width of the strips is narrowed using reactive ion etching.

7. Method according to claim 1, wherein the corrugation amplitude is set in accordance with a desired diffraction efficiency being a maximum achievable diffraction efficiency as a function of the corrugation amplitude.

8. Method according to claim 1, wherein the corrugation amplitude is set in accordance with a desired diffraction efficiency, wherein TE and TM polarization states of the impinging light have a maximum achievable difference in diffraction efficiency as a function of the corrugation amplitude.

9. Method according to claim 1 wherein the corrugation amplitude is set in accordance with a desired diffraction efficiency, wherein diffraction efficiency for TE and TM polarization states of the impinging light is equal.

\* \* \* \* \*